Dec. 16, 1947.   C. H. HOWLAND-SHEARMAN   2,432,522
MACHINE TOOL
Filed Oct. 9, 1944   18 Sheets-Sheet 1

Inventor
C. H. Howland-Shearman, Dec'd
B. W. Howland-Shearman, Execx.

By Rockwell & Bartholow
Attorneys

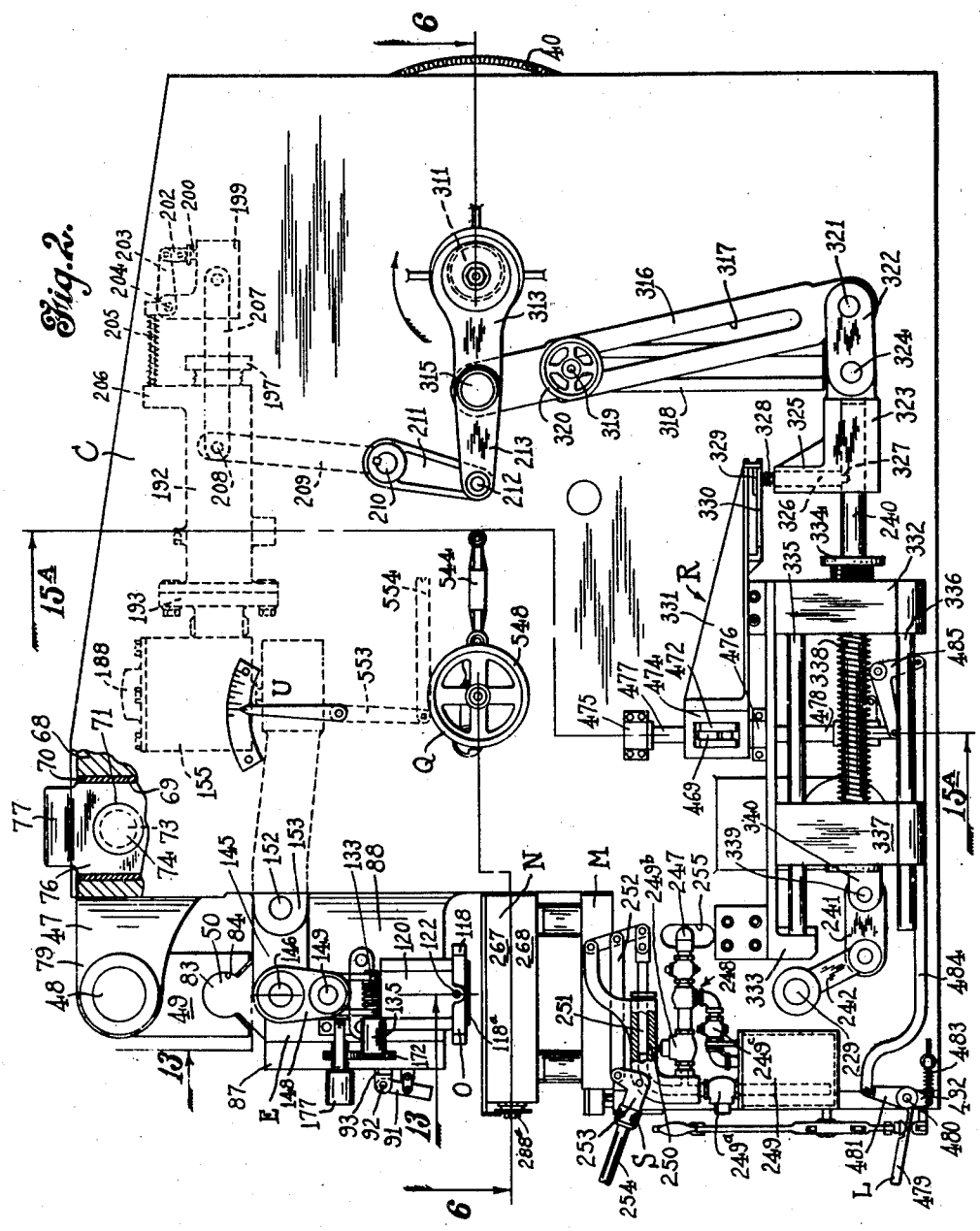

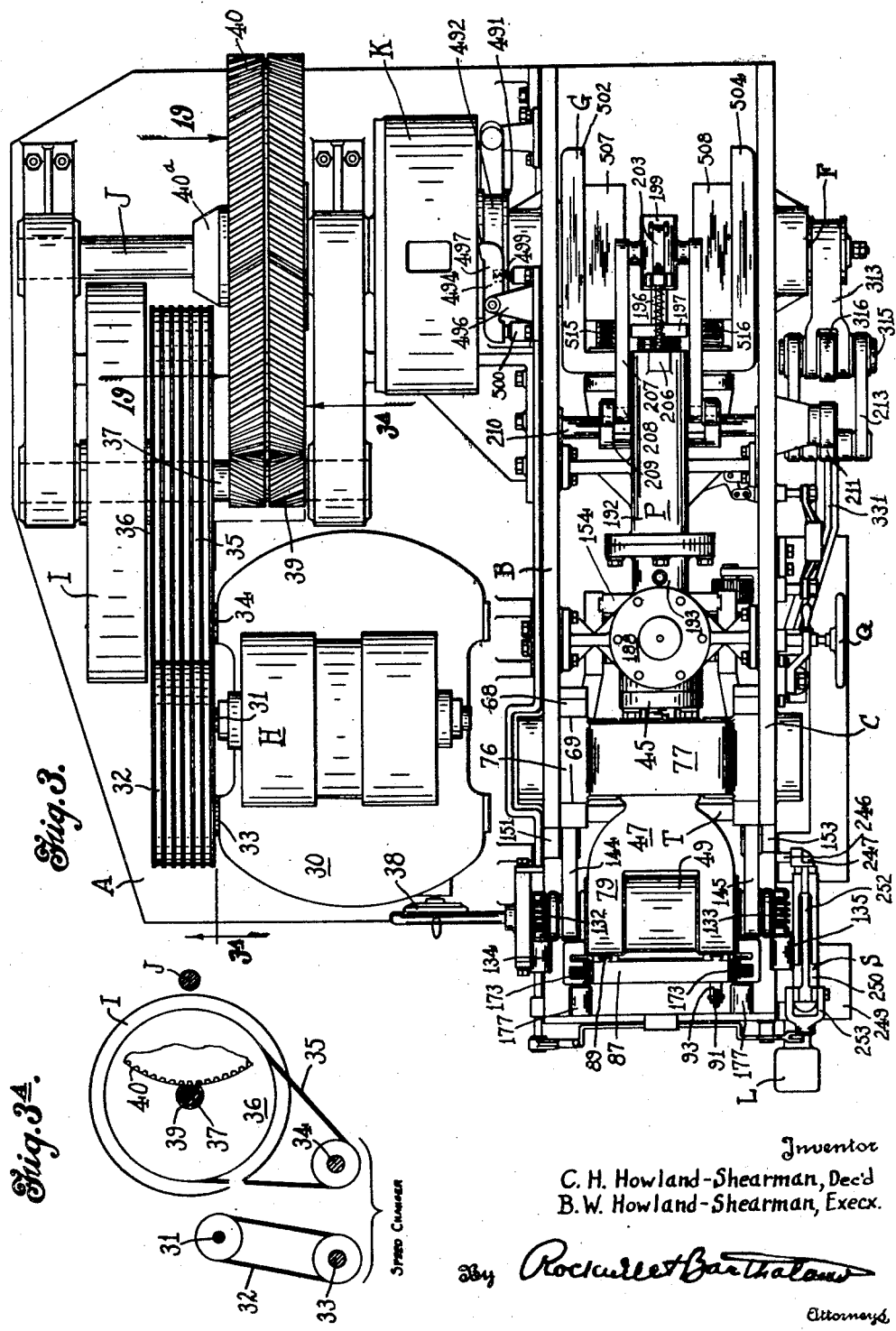

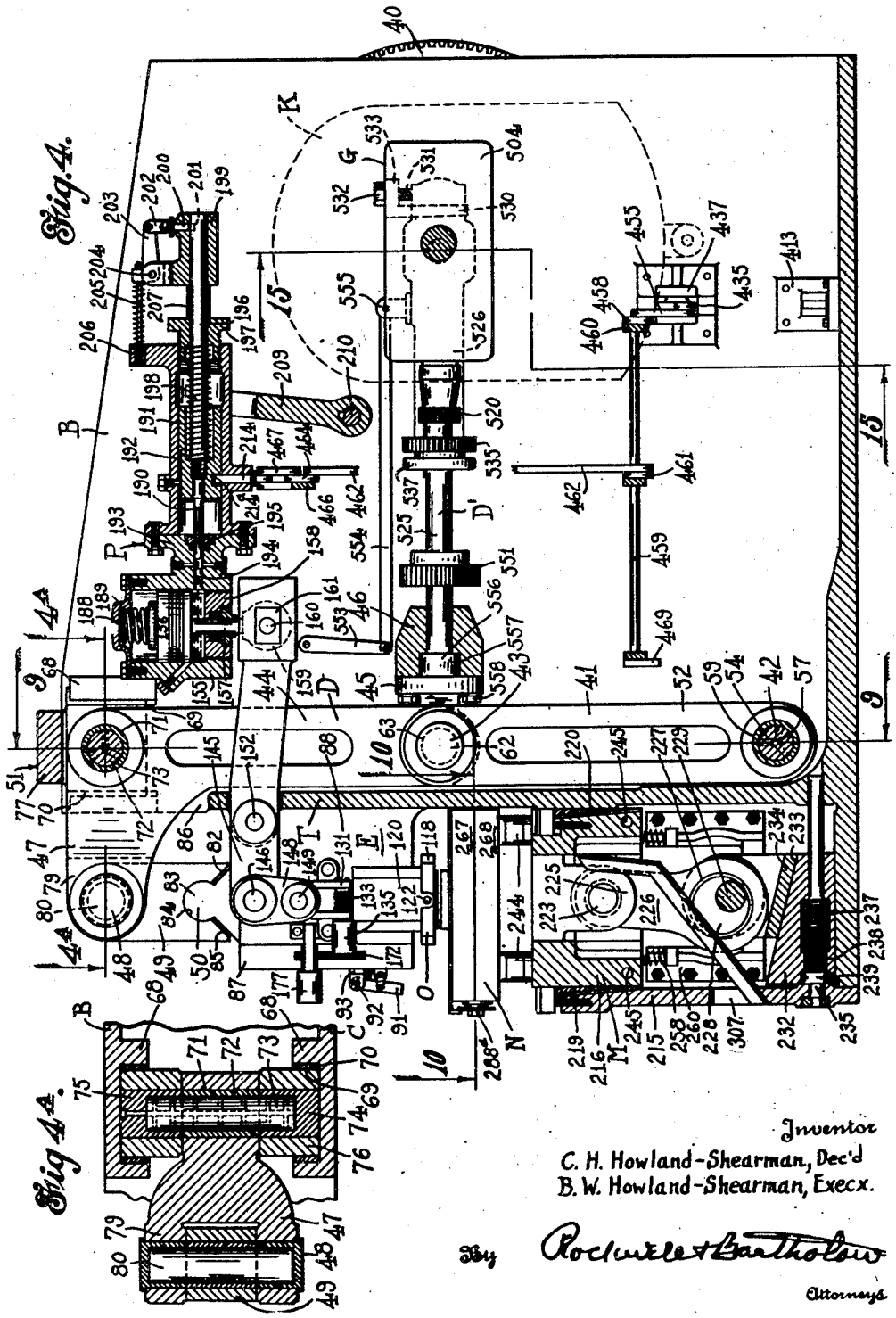

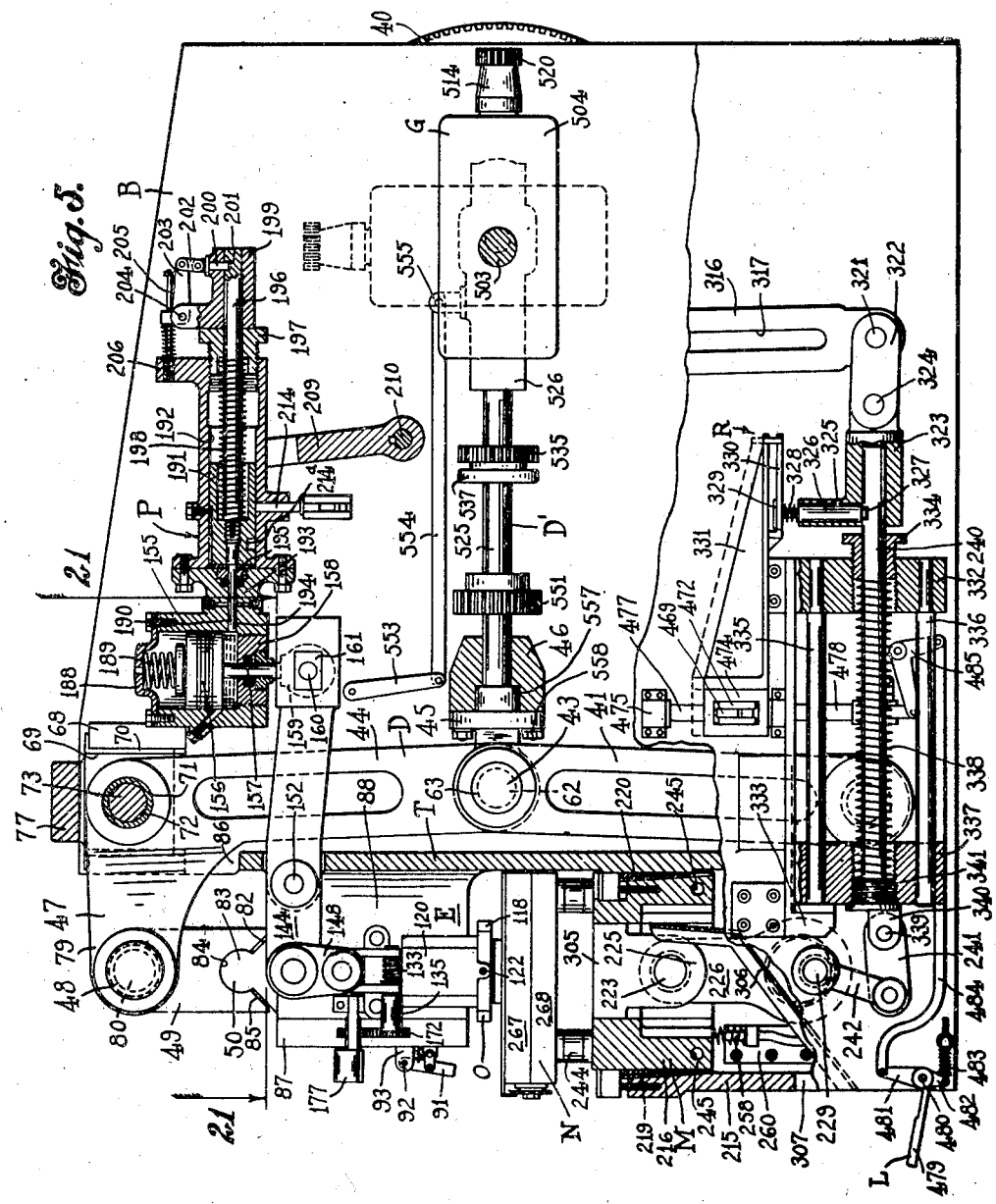

Dec. 16, 1947.  C. H. HOWLAND-SHEARMAN  2,432,522
MACHINE TOOL
Filed Oct. 9, 1944  18 Sheets-Sheet 6
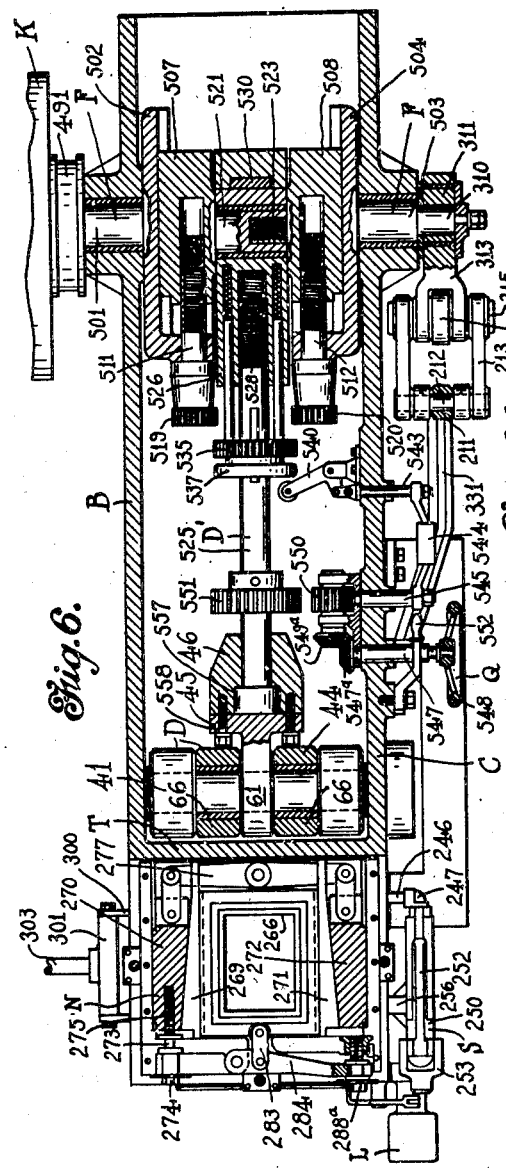
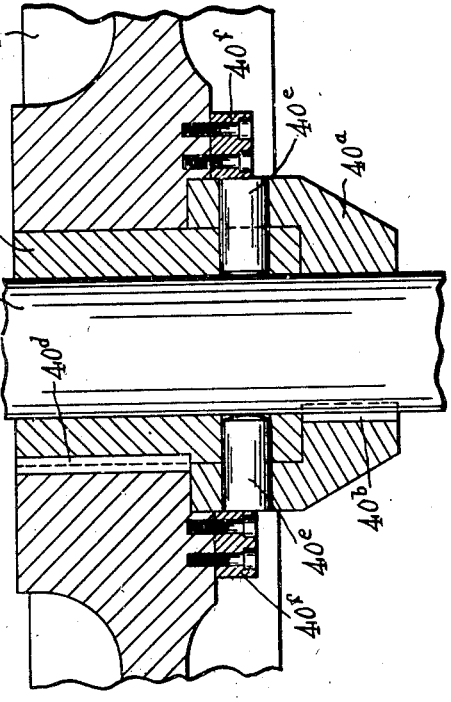
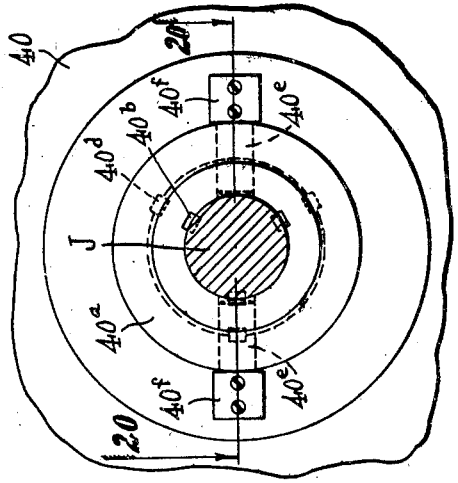
Inventor
C. H. Howland-Shearman, Dec'd
B. W. Howland-Shearman, Execx.
By Rockwell & Bartholow
Attorneys

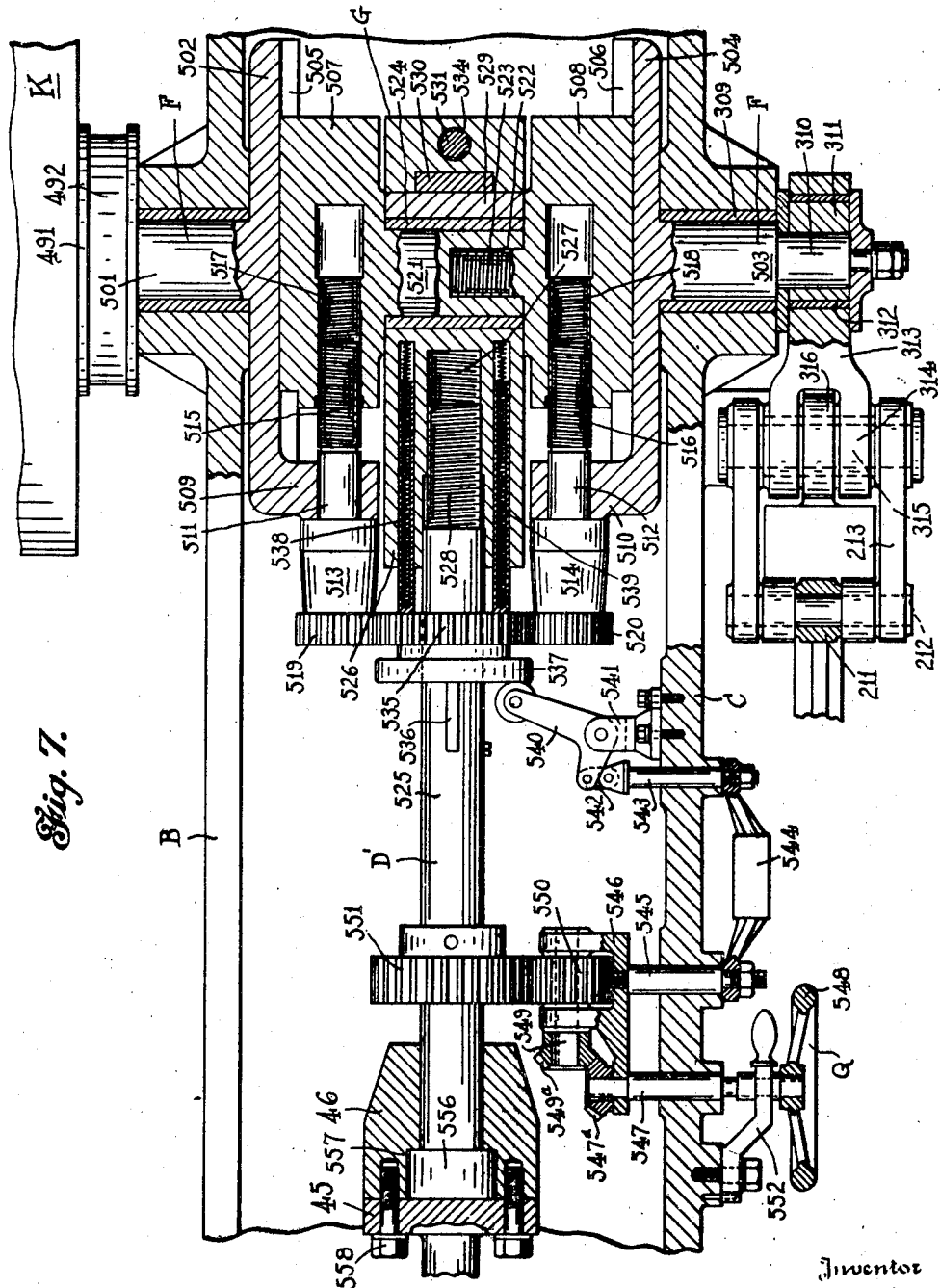

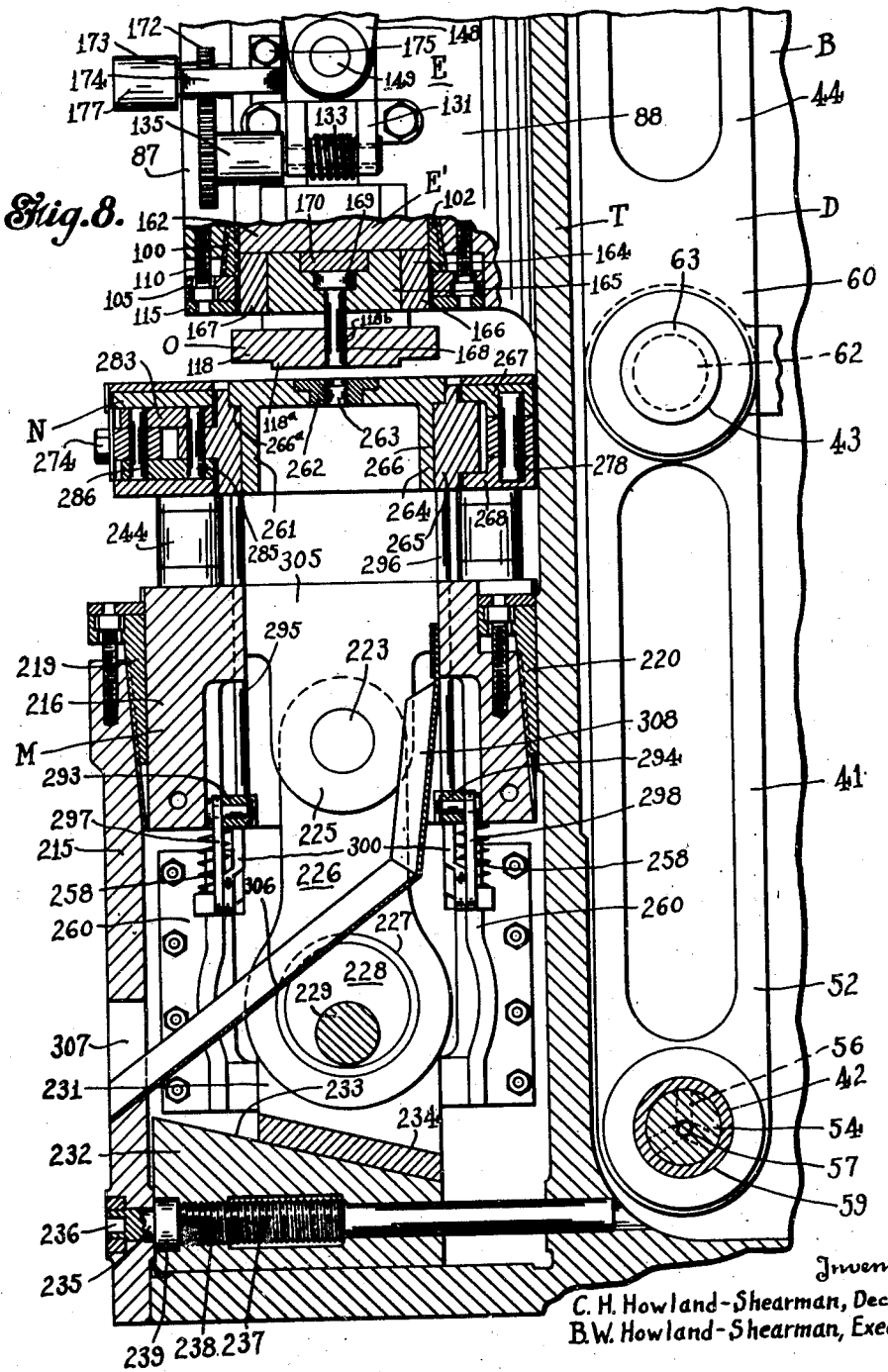

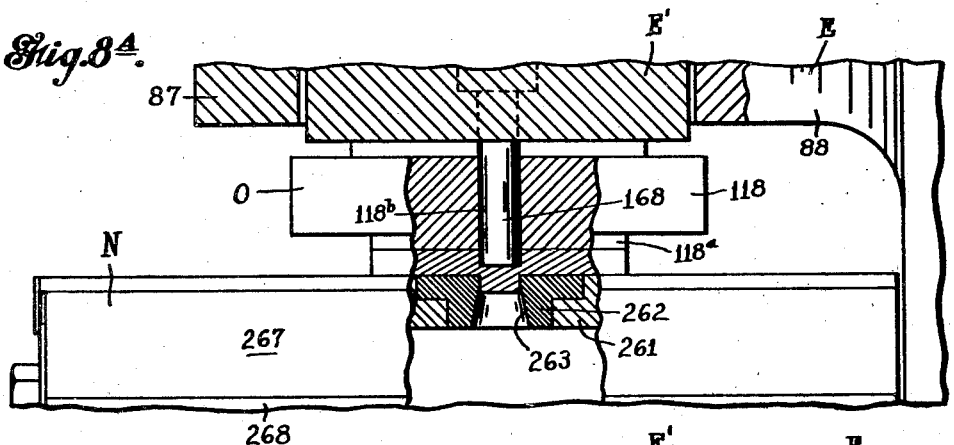
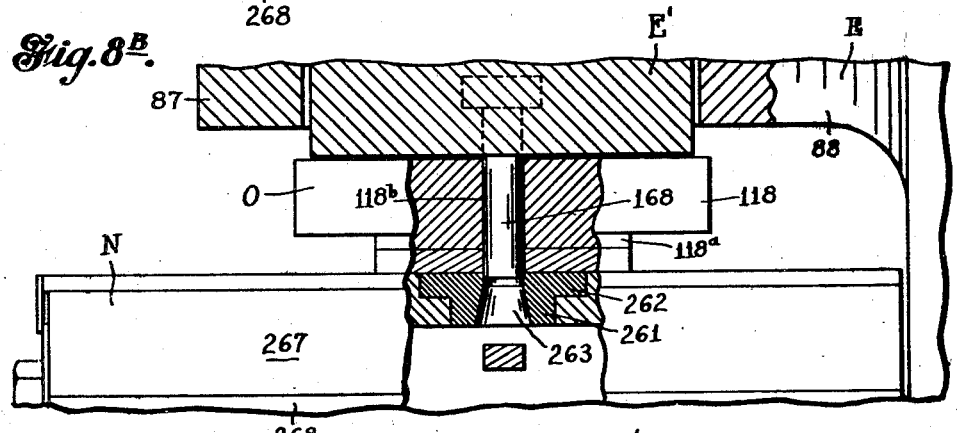
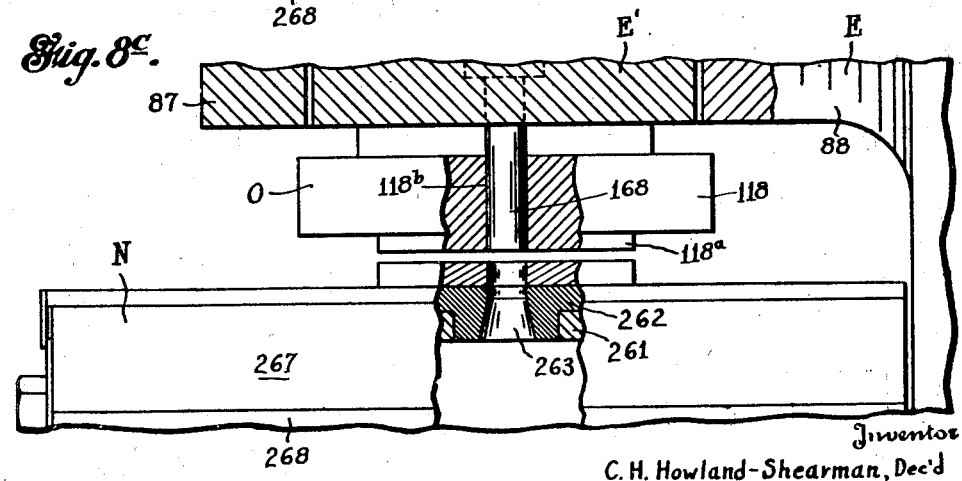

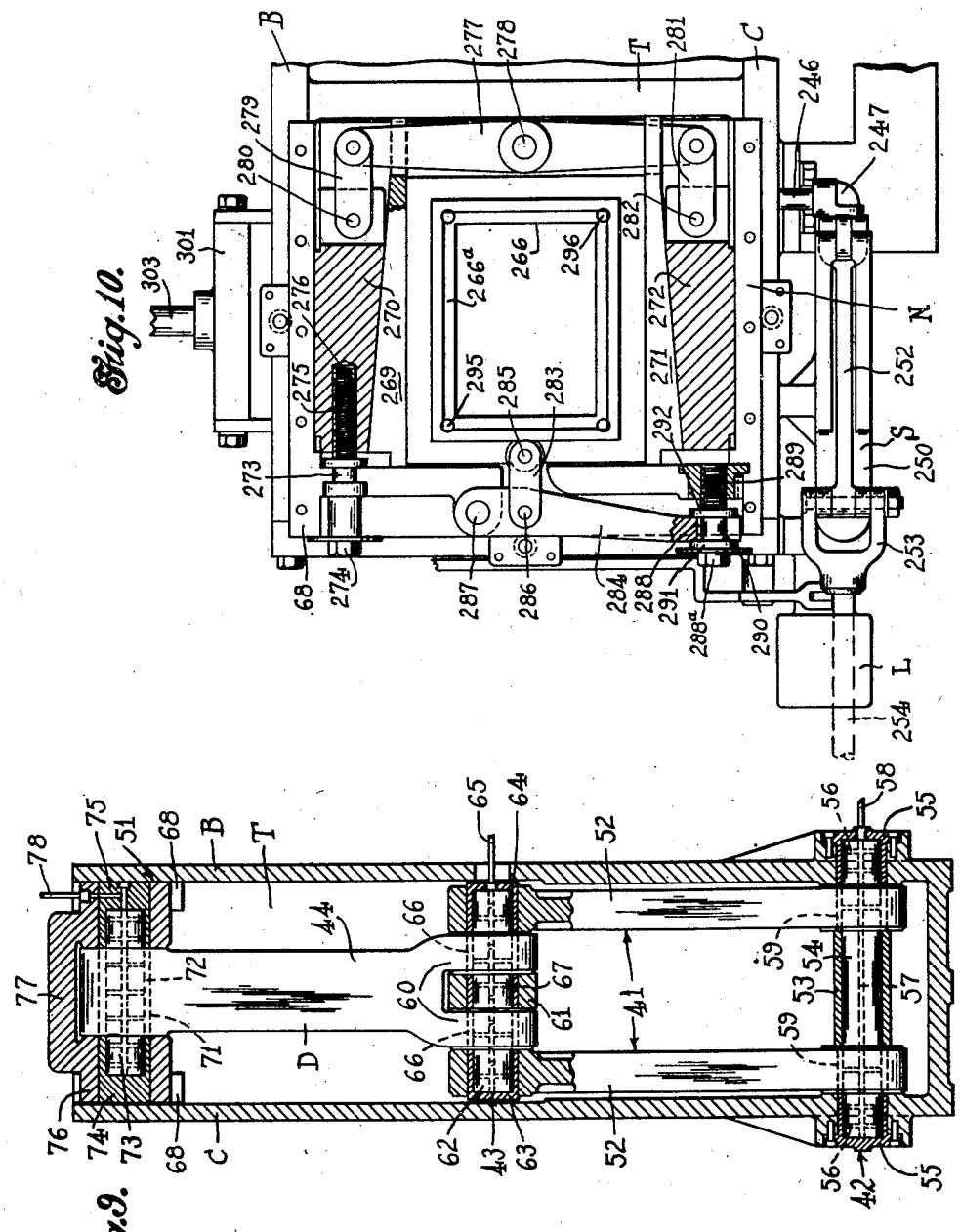

Dec. 16, 1947.　　C. H. HOWLAND-SHEARMAN　　2,432,522
MACHINE TOOL
Filed Oct. 9, 1944　　18 Sheets-Sheet 11

Inventor
C. H. Howland-Shearman, Dec'd
B. W. Howland-Shearman, Execx.

By Rockwell + Bartholow
Attorneys

Dec. 16, 1947.    C. H. HOWLAND-SHEARMAN    2,432,522
MACHINE TOOL
Filed Oct. 9, 1944    18 Sheets-Sheet 14

Inventor
C. H. Howland-Shearman, Dec'd
B. W. Howland-Shearman, Execx.
By Rockwell & Bartholow
Attorneys Dec. 16, 1947.　　C. H. HOWLAND-SHEARMAN　　2,432,522
MACHINE TOOL
Filed Oct. 9, 1944　　18 Sheets-Sheet 15
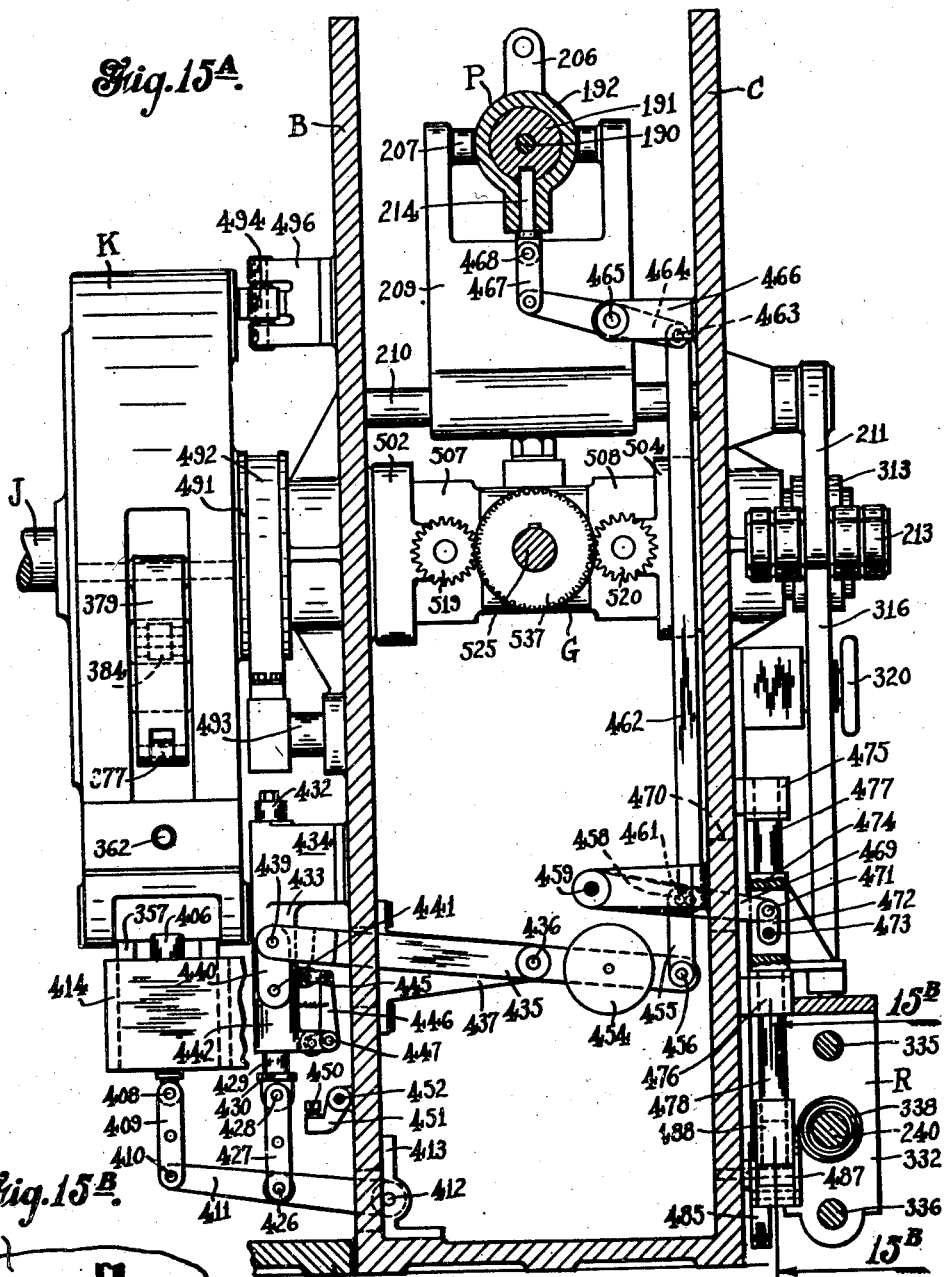
Fig. 15ᴬ.
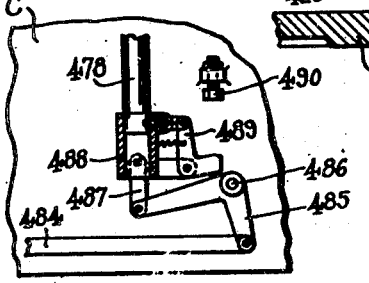
Fig. 15ᴮ.
Inventor
C. H. Howland-Shearman, Dec'd
B. W. Howland-Shearman, Execx.
By Rockwell & Bartholow
Attorneys

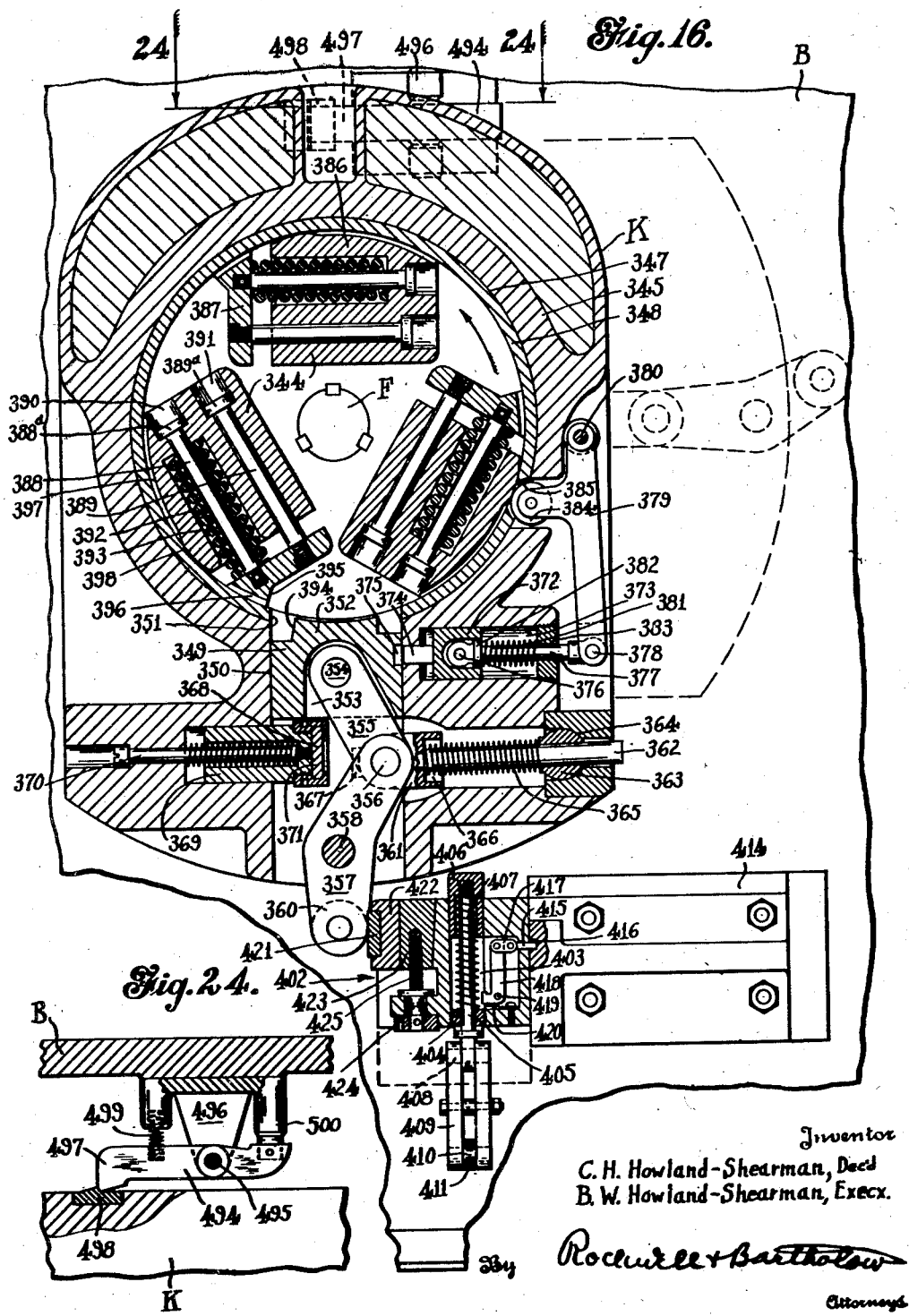

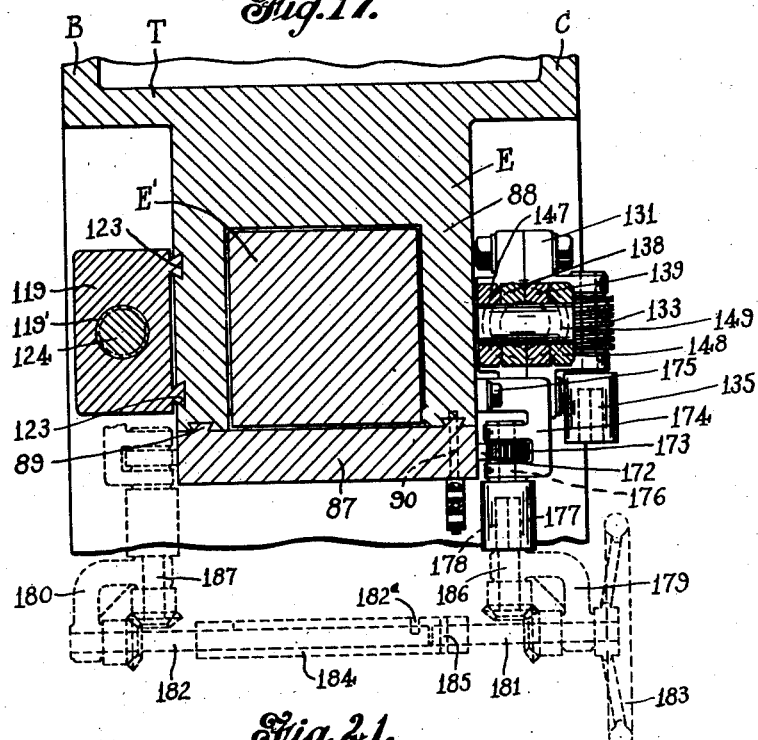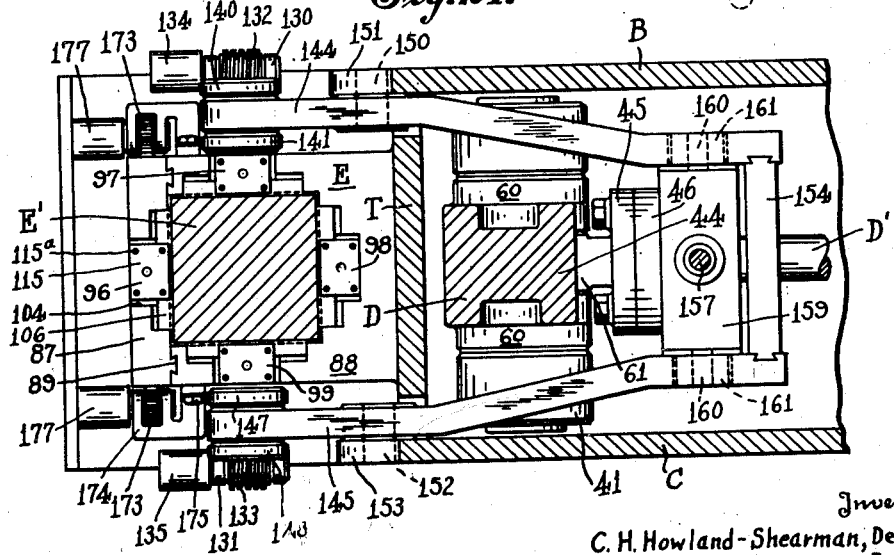

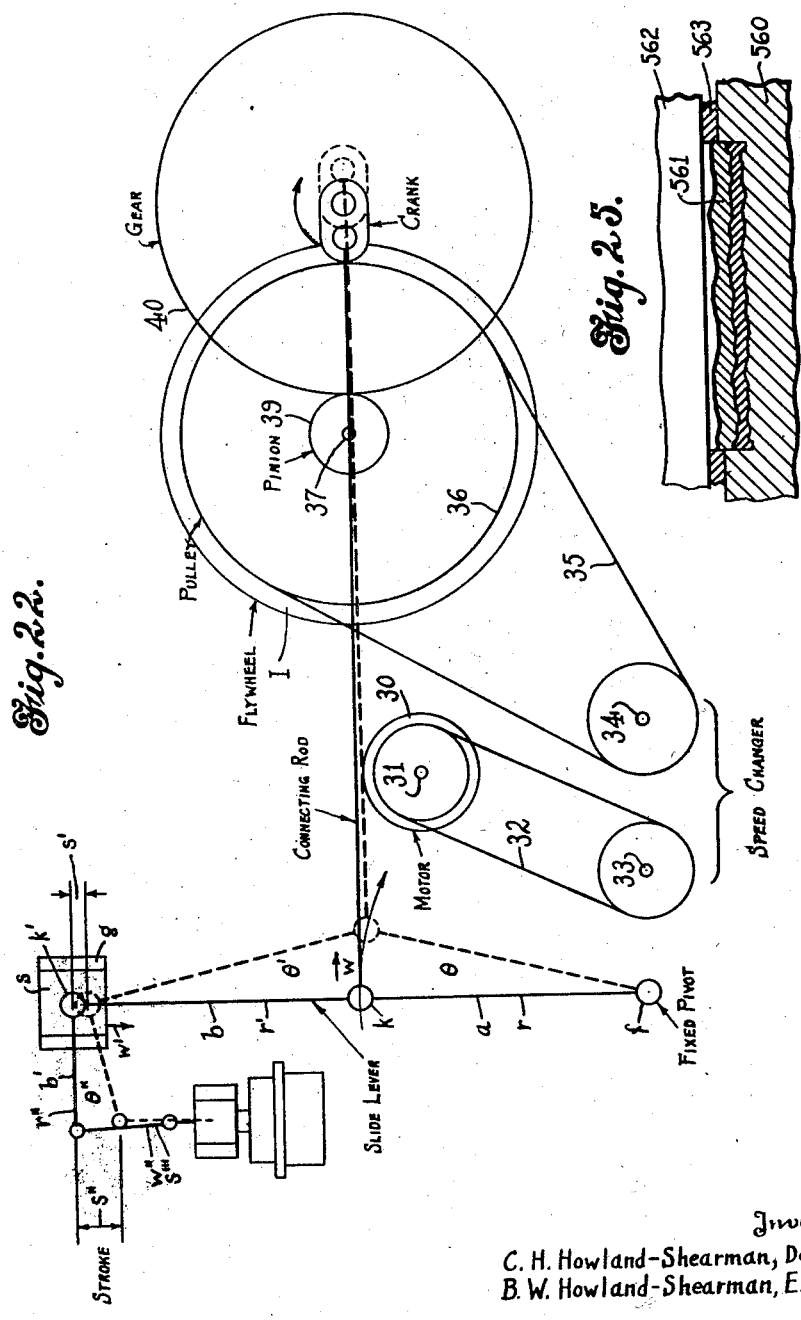

Patented Dec. 16, 1947

2,432,522

UNITED STATES PATENT OFFICE 2,432,522

MACHINE TOOL

Charles H. Howland-Shearman, deceased, late of Hamden, Conn., by Beatrice Wimer Howland-Shearman, executrix, Hamden, Conn.

Application October 9, 1944, Serial No. 557,819

89 Claims. (Cl. 164—86)

This invention relates to machine tools of the same basic type or class as that disclosed in the Howland-Shearman Patent No. 2,039,842 of May 5, 1936. In general, the machine tool of that patent may be described as one employing a linkage of the infinite-plane type for developing great power in operating a tool-carrying ram, the ram operations being much more rapid than those of the ordinary hydraulic press, and there being, on the other hand, such a nice control of the material operated on, and the working parts, that what was a precision tool for metal-working operations, either upon cold or hot metal, was provided.

A general object of the present invention is greatly to improve and simplify the structure of the machine and increase its productive capacity and enlarge its range of use and enhance its effectiveness, convenience of operation and general utility.

Another aim is to provide an improved high-power linkage for operating a ram, and more especially it is aimed to provide a ram stroke of greater amplitude than in previous machines, requiring on the other hand less crank length for operation of the tractor levers and tool beam.

A further object is to provide improved fracture-proofing means.

Another object is to provide an improved work table and an improved form of work table control.

Other objects of the invention are to provide for the quick changes of tools, to provide for effective micrometric control of the ram stroke, to overcome shocks between tool and material, and also overcome any abrasive chatter or generation of heat, to provide for the quick and easy centralizing of the tools with respect to the ram axis, to improve the handling facilities of the machine so as to adapt it for operation by ordinary shop workers rather than those of the tool-maker class, and to provide for the machine an improved clutch capable of neutralizing all vibratory shocks and of thus preventing injury either to the product or to the machine.

To these and other ends the invention consists in the novel features and combinations of parts and procedures hereinafter described and finally pointed out in the claims.

In the accompanying drawings:

Fig. 2 is a side elevation, certain parts being broken away;

Fig. 3 is a top plan view;

Fig. 3A is a somewhat diagrammatic sectional view taken on line 3A—3A of Fig. 3;

Fig. 4 is a vertical section with some parts broken away, the section being taken in a plane to illustrate the high-pressure linkage, this linkage being in position for starting a ram stroke, the work table being only partially raised and the fracture proofer being in its elevated or inoperative position;

Fig. 4A is a section on line 4A—4A of Fig. 4;

Fig. 5 is a sectional view similar to Fig. 4 but differing therefrom in some particulars, showing the condition at a certain stage in the working cycle of the press;

Fig. 6 is a section on line 6—6 of Fig. 2;

Fig. 7 shows on a larger scale certain parts illustrated in Fig. 6, the mechanism being in another position;

Fig. 8 is an enlarged vertical section on line 8—8 of Fig. 1;

Figs. 8A, 8B and 8C are views showing different stages of the operation on the work in a cold flowing operation, as hereinafter described;

Fig. 9 is a section on line 9—9 of Fig. 4;

Fig. 10 is a section on line 10—10 of Fig. 4, the same being on a larger scale, showing the structure of the platen, the rest plate being removed;

Figs. 14A and 14B are sections on lines 14A—14A and 14B—14B of Fig. 14;

Fig. 14C is a detail section showing one of the gibs at the upper part of the ram;

Fig. 15A is a section on line 15A—15A of Fig. 2;

Fig. 15B is a detail section on line 15B—15B of Fig. 15A;

Fig. 16 is a section on line 16—16 of Fig. 15 illustrating the shock-absorbing driving clutch, the latter being in the disengaged position;

Fig. 17 is a section on line 17—17 of Fig. 1;

Fig. 19 is a section on line 19—19 of Fig. 3, showing the shearing pins in association with the drive shaft;

Fig. 20 is a section on line 20—20 of Fig. 19;

Fig. 21 is a section on line 21—21 of Fig. 5, certain parts being omitted;

Fig. 22 is a diagrammatic view of the pressure linkage and its operating mechanism;

Fig. 23 is a detail of a member carried by the ram at its lower end;

Fig. 24 is a section on line 24—24 of Fig. 16 showing the pawl which prevents rebound of the clutch body after the clutch is disengaged; and Fig. 25 is a sectional view showing a plunger and die such as used for a coining operation.

Figure 1:
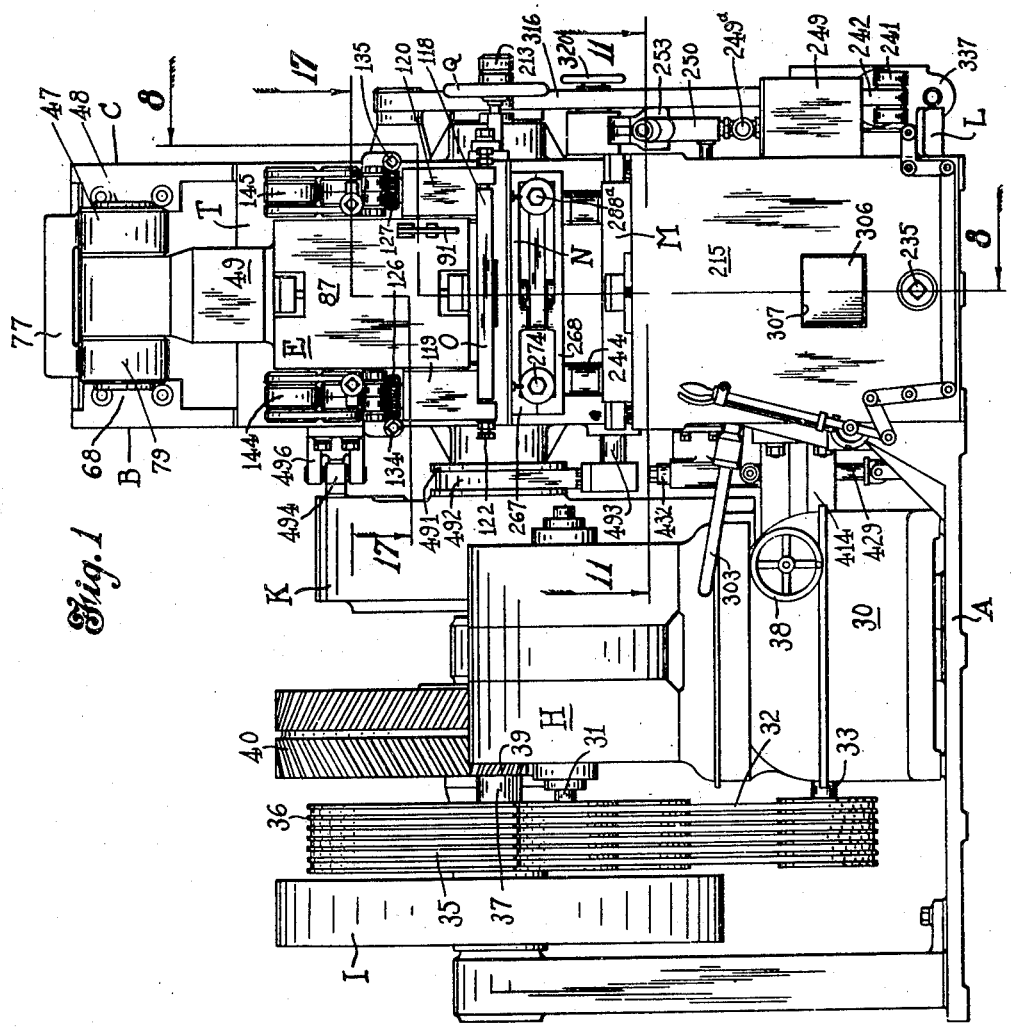
Fig. 1 is a front elevation of the machine.

The machine illustrated in the drawings as a preferred embodiment comprises a main frame having a suitable base or bed plate and parallel vertical walls between which is arranged the high-pressure linkage, including the tractor levers, the ram operated by the linkage being at the front of the machine. Between the upright walls and adjacent the rear part thereof is the crank shaft and crank by which the linkage is operated. To one side of the upright walls and on the bed plate is the power drive, including an electric motor located toward the front of the bed plate, a speed-changing gear located beneath the motor, and the necessary belt drive means, flywheel, and reduction gearing for driving the clutch device adapted to connect to and disconnect from the drive means the above-mentioned crank shaft and crank. In association with the ram is a suitable ram guide supported from the framework of the machine. Beneath the ram is located a vertically movable work table carrying at its upper part an independently movable platen in which the die or other tool element cooperating with the ram-carried tool is located. In association with the ram at the exterior thereof is a movably mounted fracture-proofing or stock-protecting element capable of bringing a very considerable pressure on the metal sheet or other work from above, so as to hold the work firmly against the platen during the stroke of the press. In this particular machine, pressure is exerted through the fracture proofer by the use of an hydraulic pressure element located between the vertical walls or frame members enclosing the linkage. The crank by which the power linkage is operated is capable of micrometric adjustment as to length, and the operating device for the adjusting mechanism for the crank and connecting rod is located where it is readily accessible, adjacent the outer face of that wall or upright frame member which is remote from the drive mechanism. At the same side of the machine as the crank-adjusting device is also a part of the actuating mechanism controlled from the crank shaft for lifting or pulsating the work table, and another device at this same side of the machine is a manually operable hydraulic device whereby the platen may be raised relatively to the work table by which it is supported.

In the drawings the base or bed plate of the machine is indicated at A, the parallel vertical frame walls at B and C, respectively, the high-pressure linkage at D, and the ram guide at E, the ram proper being indicated at E'. The crank shaft and crank for operating the linkage are indicated respectively at F and G. The power drive, which is shown in Fig. 1 as being to the left of the walls B and C, includes, with other elements, the electric motor H, the flywheel I, and the shaft J, the latter being in line with the crank shaft F and carrying at one end a member of a clutch generally indicated at K, this clutch, in the semi-automatic operation of the machine, being controlled from the front of the machine by a pedal device L. The vertically movable work table beneath the ram is indicated generally at M, and the independently adjustable platen carried by the table, at N. The fractureproofer is indicated at O, and the hydraulic pressure element associated with the fractureproofer at P. The operating device for the micrometer crank adjustment is indicated at Q. At R is indicated a part of the actuating mechanism, including a spring motor, controlled from the crank shaft, for lifting or pulsating the work table, and at S is the manually operable hydraulic device controlling the vertical positioning or set-up of the platen.

*The power drive*

The drive for the shaft J, which may be termed the main shaft, and which has associated with it the clutch K, comes from the electric motor H, which, in the form shown, is arranged toward the front of the machine. Between the motor and the main shaft are provisions by which said shaft is rotated at a suitable reduced speed, and there are provisions also whereby the speed of the main shaft is subject to regulation so that the speed can be nicely controlled. In adjusting the speed, a gear-type transmission of a suitable kind can be employed, and such a transmission is indicated generally in the drawings at 30, the same having a casing, shown as supported upon the bed plate A, and serving in turn as a mounting for the motor H. The shaft 31 of the motor has a belt and pulley connection, indicated generally at 32, with a shaft 33 (Fig. 3A) forming a part of the transmission mechanism 30, and another shaft 34, which is a part of the transmission mechanism, has a pulley and belt connection generally indicated at 35, with a large pulley 36 located on a shaft 37, this shaft being the one which carries the flywheel I. Gear transmissions such as used for the regulation of the relative speeds of two shafts are well known in themselves, and it is not deemed necessary to go into the details of the speed-changing means. The operation of the speed-changing means can be effected in any manner preferred, and in this particular case it is assumed that change of speed can be effected by adjustment of a hand wheel 38 accessible at the front of the gear box or transmission casing.

The shaft 37, on which the flywheel is mounted, is mounted on the machine bed in suitable bearing members, and at one point in its length carries a gear pinion 39 meshing with a large gear 40 on shaft J. The clutch K is associated with a portion of shaft J which is extended beyond the inner bearing member for said shaft, the clutch K being located between such inner bearing member and the adjacent frame wall B of the machine. The movable member of the clutch is connected, as will hereinafter appear, to the shaft F carrying the crank mechanism G, and the crank mechanism G is used for imparting movement to the high-pressure linkage D, as hereinafter described.

As a safety feature, a suitable shear pin device is used, which prevents damage to the drive mechanism of the machine in the event that the ram encounters abnormal resistance. This shear pin device may be associated with the large gear 40, so that in the event of an overload, the connection between the gear and the shaft J will be stripped or severed. The preferred form of the shear pin device is shown in Figs. 19 and 20, and it will be observed that, as shown in these views, gear 40 has keyed to it and to the shaft J a sleeve 40$^a$, the key or spline being shown at 40$^b$. Sleeve 40$^a$ fits over a bushing 40$^c$ surrounding the shaft and keyed to gear 40 by a key 40$^d$. The gear 40 drives through bushing 40$^c$, the sleeve member 40$^a$ (keyed to the shaft), through shear pins 40ᵉ, interconnecting the two sleeves, and under abnormal load, the pins 40ᵉ will be sheared off so that the gear will rotate loosely on the shaft. Blocks 40ᶠ, applied to the hub portion of the gear wheel, hold the shear pins in place.

The high-pressure linkage

The high-pressure linkage D is actuated from the crank G by means of a connecting rod or pitman D', best shown in Figs. 4, 5 and 6. The linkage, as in the case of the Patent No. 2,039,842, is basically of the disrupted articulate infinite-plane type and comprises tractor levers and a tool beam operable from the levers and in turn actuating the sliding ram. However, the linkage proper and tool beam arrangement and the connection between the linkage and the operating crank are of a different and notably improved kind and structure. In the present machine a single pair of tractor levers is employed, the same being vertically arranged, with one lever above the other. The lower lever is fixedly pivoted at its lower end to the machine frame and is pivoted at its upper end to the lower end of the upper tractor lever. The upper tractor lever is of a novel character and form in that it is provided, as an integral part thereof, with an extension serving as a tool beam to the free end of which the ram is connected. This second lever also has a novel mounting in that it is so arranged that its upper end portion will have a sliding movement relatively to a suitable frame member or frame portion. For this reason the upper tractor lever may be correctly termed a slide lever, and such a lever has many advantages from the standpoint of the machine structure and from the standpoint of the work to be performed, some of which advantages will hereinafter appear.

In the drawings, the lower tractor lever is indicated at 41, and this lever is fixedly pivoted in the lower part of the frame, as indicated at 42, this pivotal mounting comprising a pivotal member mounted in and bridging the space between the frame plates B and C. At its upper end the lever 41 is connected by a pivotal connection or knuckle pin 43 to the lower end of the upper lever 44. The pivotal connection 43 between the two levers is connected, by means of a coupling including the members 45 and 46, to the forward end of the connecting rod D'. At its upper end, the lever 44 is provided with a forward extension 47 at right angles to the main body of the lever, whereby the upper end portion of the lever is given an elbow shape. At the forward end of the extension 47 the lever is pivoted by a pivotal connection 48 to a depending short link 49. The lower end of the link 49 is connected by a pivotal joint 50 to the upper extremity of the ram E'. At the elbow provided by the connection of extension 47 with the body portion of the lever 44, this lever has a sliding and swinging connection with the machine frame, which sliding and swinging connection is generally indicated at 51.

The lower lever 41 is preferably of duplex structure, comprising parallel members 52 (Fig. 9) that are spaced laterally from each other, and are engaged with the lower pivot structure 42 at spaced points in the length of the latter. A sleeve 53 spaces these members apart at their lower ends. The pivoting structure 42 includes also a pivot pin 54 about which the sleeve 53 is applied, and end caps 55 applied to the ends of the pin for mounting them in the frame walls.

The pin 54 is provided with a plurality of interior lubricating ports 56 radiating from a central longitudinal bore 57 in the pin, and a tube 58 carries lubricant through one of the end caps to the pin. By the construction described, a film of oil is carried to the outer surface of the pin 54, and this pin is free to float in its socket 59. Lever elements 52, which have bushings surrounding the pin, are free to swing with the pin or independently, thereby providing a very free-acting pivotal connection of the lever with the frame, without, however, permitting any looseness or play.

The pivotal or knuckle connection 43 between the two levers is generally similar to the pivotal connection just described. The upper lever 44, however, is made in one piece, having a bifurcated lower end 60 set in between the upper extremities of the elements 52, and in turn straddling a member 61 which is in the form of a lug, projecting from coupling member 45, and having a perforation alined with perforations in the ends of elements 52 and in the bifurcated portion 60. These alined perforations enable a knuckle joint, such as shown in Fig. 9, to be created, this joint including a pivot pin 62 similar to pin 54 (having generally similar lubrication passages), this pin being confined by end caps 63 and 64. End cap 64 is connected by a tube 65 to the lubricant supply. The end caps 63 and 64 are closely fitted within the perforations in the members 52. In the perforated branches or tines of lever 44, bushings 66 are arranged, which fit about the pin between the end caps and a bushing 67 arranged in the perforation of lug 61.

For the purpose of providing the pivoting and sliding connection 51 at the elbow portion of lever 44, the frame of the machine is constructed to provide a stationary guide, and this may be done by providing on the inner faces of the frame walls B and C, integral vertical guides 68 by means of which vertical guide grooves 69 are created. Each of these guides is preferably lined at the respective sides by layers of suitable lining material, as indicated at 70. Within the elbow portion of the lever 44 the lever is provided with a perforation 71 permitting it to receive a bushing 72, which bushing is fitted over a pivot pin 73. This pivot pin 73 is similar to the pivot pins which have just been described, being provided with a longitudinal lubricant passage and with radial ducts. End caps 74 and 75 enclose the pin at the ends, lining up with sleeve 72, and located over the end caps are portions of a cross head member 76 guided vertically in the vertical guideways of the frame. The portions of the cross head 76 which surround the ends of the pin are interconnected by an upper connecting portion or yoke 77, as best shown in Fig. 9. Lubricant for the pin 73 may be furnished from a flexible tube 78 connected to one end portion of the cross head, as shown in Fig. 9.

In the forwardly projecting part of lever 44, that is to say, in front of the pivotal connection just described, the lever is widened, as shown in Fig. 4ᴬ, to present a forked portion 79 having arms or branches between which the upper end of the ram link 49 is pivoted by the pivotal connection 48, previously mentioned. The pivotal connection 48 may be of the kind previously described, that is, it may embody a free-floating pivot pin 80 mounted in bushings, the end bushings being in the nature of caps, as previously described, in order that the pin may be fully enclosed and supported in a free-floating manner by a lubricant under pressure. In Fig. 4A the connections to the lubricant source, which may be similar to those previously mentioned, are omitted.

For the purpose of permitting a limited amount of pivotal movement between the lower end of the ram link 49 and the upper end of the ram E', the joint 50 embodies a projection and socket connection in which one of the parts has a head formed as part of a cylinder engaged in a correspondingly shaped socket in the other part, thereby permitting relative movement between the link and ram in the plane of movement of the linkage. In the particular form shown, the ram E' has at its upper end portion an upward projection 81, with upwardly converging inclined side portions 82, and at the summit of these inclined portions a partly cylindrical transverse head 83 fitting a correspondingly shaped socket 84 in the lower end portion of the ram link. Adjacent the mouth portion of the socket 84 in the ram link, the link is provided with inclined surfaces 85 opposing those on the ram and permitting a limited amount only of swinging movement between these parts. The ram link, however, is permitted a very full swing in the forked end of lever 44, when the front part of the ram guide is removed, as hereinafter described. The ram can then be swung with the link in order to permit easy access for inspection, repair and the like.

The ram mounting

The ram guide E, previously referrred to, is a box-like structure guiding the ram rectilinearly, and this structure is mounted upon and projects forwardly from a supporting wall T. This supporting wall extends between and interconnects the walls B and C immediately in front of the tractor levers, and wall T also serves to an extent in supporting the work table M and some of its adjuncts. Between the upper end of wall T and the top of the machine frame a space is left, as indicated at 86, to allow clearance for the forward projection on the upper tractor lever. The ram guide E extends around the ram on all four sides, as shown in Figs. 17 and 21 (the ram preferably being of rectangular cross section), and the front wall is made separate from the other walls and removable therefrom. The removable front wall is shown at 87, and the integral structure comprising the other three walls of the guide is indicated at 88. The front wall 87 has an interlocking sliding connection with the structure 88, and in the form shown the front wall is provided with dove-tail ribs 89 on its rear face engaging correspondingly shaped grooves in the guide body.

Figure 18:
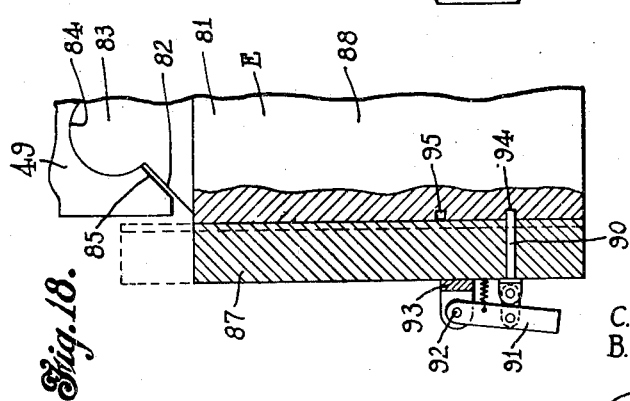
Fig. 18 is a partial vertical section through the slidable front wall of the ram guide.

For holding the front wall 87 against displacement in a vertical direction, suitable fastening means is employed, as shown, for example, in Figs. 17 and 18. In these views the front wall is shown as provided at one side with a sliding locking pin 90 shiftable in and out by a spring-pressed lever 91 pivoted at 92 in a bracket 93 applied to the outer face of the front wall. The pin 90 is adapted to engage sockets in the stationary part of the guide structure, one of these being a lower socket 94, and another being an upper socket 95 (Fig. 18). It will be evident that when the pin engages socket 94, the front guide wall is held in the position for normal operation. When it is desired to have access to the lower end of the ram for inspection, repair, changing tools or the like, the front wall can be held in that upper position, indicated in dotted lines in Fig. 18, in which position the sliding pin engages the upper socket 95.

For the purpose of centralizing the ram E' and controlling its position and direction of movement in a very precise manner, an adjustable gib mounting is provided between the ram and its guide, and a preferred form of this mounting is illustrated in Figs. 13, 14, 14A, 14B and 14C. In the preferred form there is an adjustable gib with a wedging surface arranged to be moved positively either up or down by an adjusting screw, associated with each of the four walls of the guide adjacent the upper end of the guide, and there is a similar set or series of similar gibs adjacent the lower end of the guide. Thus in the preferred form there are eight gibs in all, each positively adjustable up and down by a screw and each adjustable independently of all of the others.

The gibs associated with the upper end of the guide are indicated respectively at 96, 97, 98 and 99 (Fig. 14B), gib 96 being the one associated with the front wall. Similar gibs 100, 101, 102 and 103 are associated with the lower end portion of the guide. As all of these gibs are identical, a description of one will suffice, and the gib 99, shown in Fig. 14C, may be taken as an example. In this form the stationary part of the guide near the end is provided with a cut-away portion 104 midway of the side of the rectangle, and in this cut-away portion is received a laterally extending lug portion 105 projecting outward from the upper end portion of a wedge 106. This wedge 106 extends over a considerable portion of the side face of the ram in a lateral direction so as to extend into close proximity to the adjacent corners of the guide, and the inner face of the wedge is flat and smooth so as to lie against the ram face for guiding it. At the opposite face the wedge has a tapered surface 107 engaging a correspondingly tapered or inclined surface on the stationary part of the guide. The lug 105 is provided in its upper face with a socket 108 receiving the head 109 of an adjusting screw 110 having a shank passing loosely through an opening 111 in the lower portion of the lug, the socket 108 and opening 111 being somewhat elongated to allow lateral movement of the wedge relatively to the screw. The shank of the screw is provided with screw threads 112, and these threads engage corresponding threads 113 in a socket 114 provided in the stationary part of the guide. A small plate 115 is suitably attached to the upper surface of the lug 105 by means such as screws 115a, and this plate 115 serves to hold the screw 110 from axial movement, although it is free for rotation. The plate 115 is provided with an opening 116 of less diameter than the screw head, and through the opening 116 access may be had to the head of the screw so that a suitable tool may be engaged in a socket 117 in the head of the screw for turning the screw in the direction desired.

The result of turning the screw in one direction will be to move the screw inwardly in its socket, thereby moving the wedge member inwardly in respect to the ram opening whereby the wedge member or gib is brought into closer contact with the ram face. In this operation the wedge member moves positively with the screw as a result of its engagement by the under portion of the screw head. When the screw is rotated in the opposite direction, the wedge is positively moved by the engagement of the screw head against the plate 115 fastened to the wedge, and when the wedge is moved in this way it will be apparent that the closeness of its contact with the ram face will be lessened.

It will be understood that by the described arrangement of the gibs the upper portion of the ram can be very precisely and easily centered or located, each upper gib being adjustable independently of the others, and the adjustment provided by each being such as to enable a very fine or nice adjustment to be made as required for high precision work. Similarly, the four gibs provided in association with the lower end portion of the ram enable that portion to be centered or located in a very accurate manner. Furthermore, it will be noted that the two sets of gibs in conjunction enable the angularity of the line of movement of the ram to be adjusted within certain limits. If, for example, it is desirable for the axial line of movement of the ram to be exactly perpendicular to a horizontal plane, this can be brought about by proper adjustment of the gibs. It is usually desirable to have the line of ram movement exactly perpendicular to the platen, and by the provisions described this result can be accomplished as well as that of bringing the line of movement of the center of the ram to a desired point by adjustment laterally in any direction.

At the lower end of the ram E' the same has rigidly attached to it a hard metal plate 162 of the same cross-sectional area as the ram body. This plate 162 may be connected to the ram body by being provided on its upper face with parallel dove-tail ribs 163 fitting correspondingly shaped grooves in the lower face of the ram body. Associated with the lower face of the plate 162 is a frame-like member 164 enclosing and supporting a tool-holding block 165. In this particular case the frame-like member 164 is of rectangular shape and has a body 166 comprising three walls of a rectangle, and a piece 167 providing the fourth wall of the rectangle, so that the tool-supporting block is enclosed on all sides when the assembly is complete. In this particular case the tool carried by the ram is a cylindrical pressing tool 168 supported in the block 165 by a head portion 169 socketed in the block and firmly held in place in the block socket by an interposed metal piece 170. However, it is to be understood that the tool illustrated is merely by way of example, as well as the means for connecting it to the lower end of the ram. It will be understood, however, that the construction described, involving the frame member into which the tool-supporting block can be introduced from one end, is one making for easy interchange of tools. It is understood that the removable frame piece 167 is at the front of the ram, where it is easily accessible upon raising of the front wall of the ram guide.

As will hereinafter appear, the pressing tool 168 cooperates with a rest plate as in the Patent No. 2,039,842. In this description the terms "die" and "die plate" are used for brevity as designating parts which support the workpiece in cold flowing operations.

The tool-holding block 165 is held in position in its enclosing frame in a suitable manner as by being provided with tenons 171 engaging correspondingly formed grooves in the frame.

For easy and convenient raising of the front wall 87 of the ram guide in changing tools and the like, it is preferred to use a rack and pinion device of the kind illustrated in the drawings, this rack and pinion device being readily operable by the attendant through the use of a simple accessory giving the required power. In the form shown in the drawings, the wall 87 is provided at each side edge with a vertical rack 172 (Fig. 17) engaged by a pinion 173 mounted on a bracket 174 connected rigidly as by bolts 175 to the side of the ram guide body 88. Each of the pinions 173 is carried by a shaft 176 turning in suitable bearings in the bracket 174. On the front end of the shaft 176 is a head 177 provided with a polygonal socket 178 by means of which the shaft 176 can be turned for the purpose of raising and lowering the guide wall.

For convenient operation by the attendant, an accessory wrench device is provided whereby the pinions at the respective edges of the wall are operated simultaneously by rotation of a hand wheel operating wrench device engaging the socketed heads 177. Such an accessory is indicated in dotted lines in Fig. 17, and it will be seen that it preferably comprises a pair of brackets 179 and 180 respectively connected to rotating shaft portions 181 and 182, the former shaft portion 181 being directly connected to hand wheel 183 to be rotated thereby. The shaft sections 181 and 182 rotate together, but a sleeve 184, which is pinned to section 181 at 185, receives the end portion of section 182 in such a manner that the device is extensible in length to a certain degree. The section 182 has a splined connection 182ª with the sleeve, preventing independent rotation. The bracket 179 serves as a mounting for a wrench shaft 186 having a polygonal end engageable with one socketed head 177, and the bracket 180 carries a similar wrench shaft 187 for engaging the other socketed head 177, the drive of the wrench shafts from the hand wheel being effected through the use of bevel gears arranged in the maner shown in the drawings.

*The fractureproofer*

Figure 13:
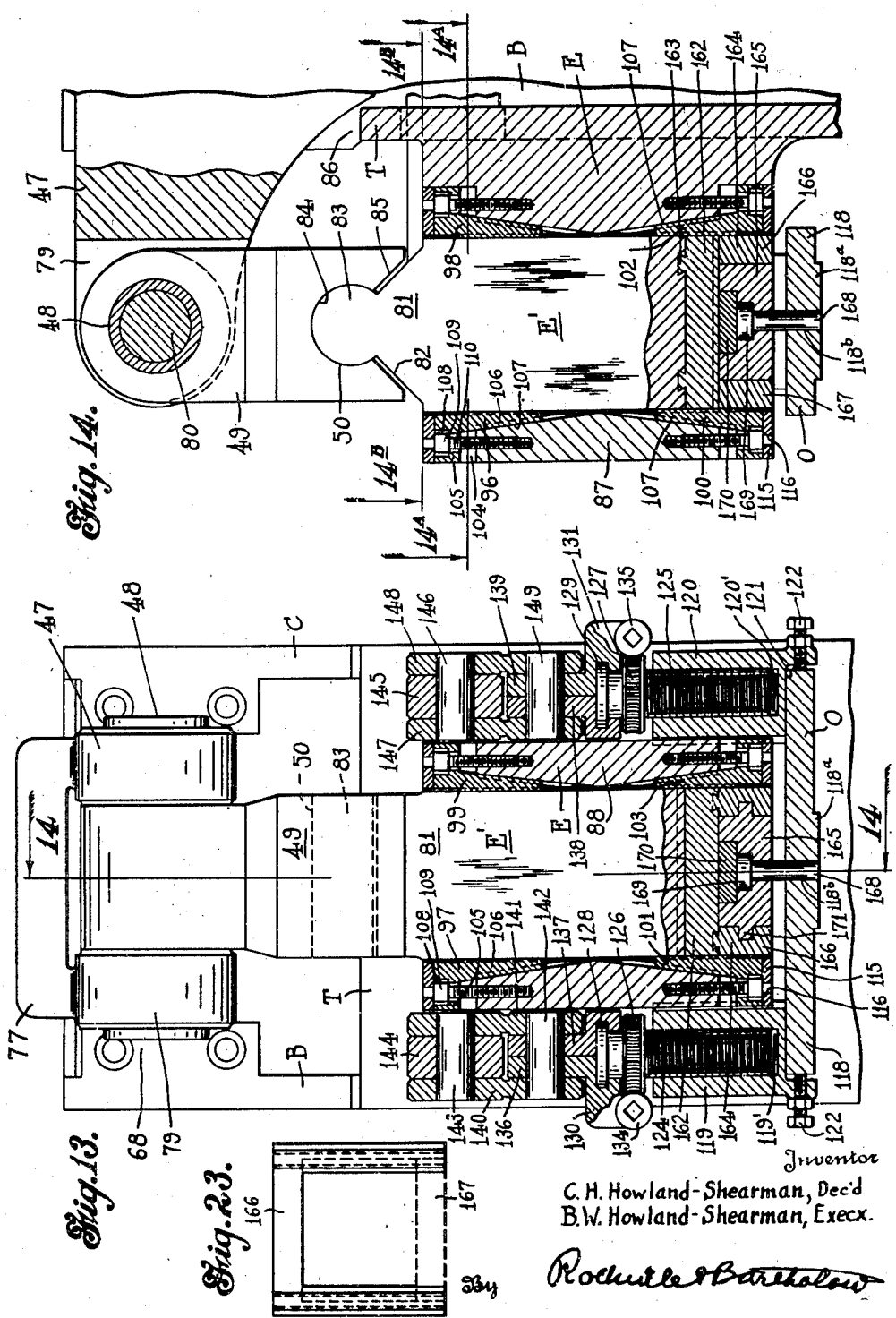
Fig. 13 is an enlarged section on line 13—13 of Fig. 2.
Figure 14:
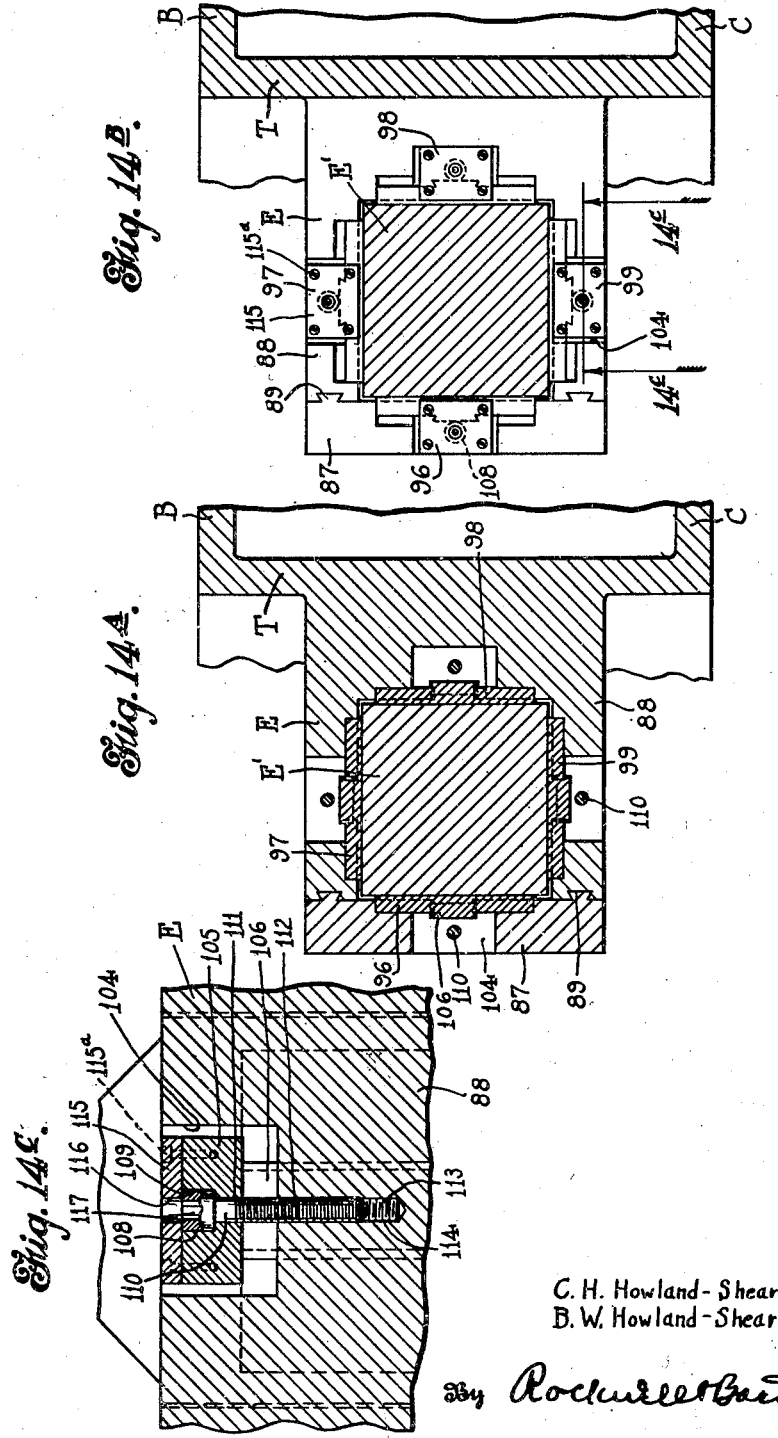
Fig. 14 is a section on line 14—14 of Fig. 13.

In association with the ram at the exterior thereof is the vertically movable fractureproofer or stock protector O operated from the hydraulic pressure element P. The fractureproofer comprises members slidably mounted on the exterior of the ram guide at the sides and operable from the hydraulic pressure element P through a suitable leverage. At their lower parts just above the platen N and just beneath the ram guide E, the guided elements of the fractureproofer are interconnected by the fracture-proofing plate. This fracture-proofing plate is shown in Figs. 13 and 14 at 118, and it will be seen that this is a transversely arranged plate of a width comparable to that of the ram, held in place between guide blocks 119, 120, guided vertically on the respective sides of the ram guide E. Each of these blocks 119 and 120 has an angular recess 121 at its lower part, where it projects below the ram guide to a certain extent in the raised position of the fractureproofer, and in each of these recesses 121 the corresponding end portion of the fracture-proofer plate is held by means of suitable bolts 122 or the like. Each of the guide blocks 119 and 120 is provided at its inner face with dove-tail ribs 123 engaging correspondingly shaped grooves in the ram guide and providing for vertical sliding movement of the block. The respective blocks are provided with vertical threaded sockets 119' and 120' open at the top, and these sockets are respectively engaged by threaded shanks 124, 125 carrying worm gears 126, 127 and having upper headed ends 128, 129 rotatively socketed in duplex members 130, 131.

Each of the duplex members 130, 131 has an outer part in which is mounted a horizontal worm engaging the corresponding worm gear, and each worm has a socketed operating head at the front of the machine. The worms are indicated at 132 and 133, and their operating heads at 134 and 135. Each of the members 130, 131 has an inner part mating with the outer part, the two parts presenting upwardly projecting lugs 136, 137 and 138, 139. Outside of the lugs 136, 137 are located the lower ends of short levers 140, 141 pivotally connected thereto by a pivot pin 142, the upper extremities of these levers being pivotally connected by a pin 143 to the forward end of an operating lever member 144. At the opposite side of the ram guide this structure is duplicated, there being an operating lever member 145 corresponding to lever 144 and pivotally connected by a pin 146 to the upper ends of short levers 147, 148. The lower ends of the last-named levers are connected by a pivot pin 149 to the lugs extending upwardly from the two-part member in which the screw member 125 is rotatably mounted.

By referring to Fig. 21 it will be seen that the operating lever members 144 and 145 are extended rearwardly for cooperation with the hydraulic pressure element P. Member 144 is pivoted intermediate of its ends on a pivot pin 150 mounted in a lug 151 on frame wall B, and member 145 is pivoted by a pivot pin 152 carried by lug 153 on frame wall C. The members project rearwardly through suitable clearance openings in the wall T, as shown in Fig. 21. At their rear extremities the members 144, 145 are interconnected by a suitable transverse connecting member 154, so that the two lever arms act in effect as a single lever. Connection with the hydraulic pressure element P is preferably made slightly in front of the rear extremity of the lever structure.

The hydraulic pressure element in this case comprises a vertically arranged cylinder 155 having a piston 156 therein, there being a piston rod 157 extending downwardly from the piston through a suitable cylinder head 158. The connection between the piston rod 157 and the lever structure 144, 145 is such as to compensate for the arcuate movement of the end of the lever structure, and this may be accomplished by mounting a swinging body 159 by means of trunnions 160 in the end portions of the lever arms, and connecting the lower end of the piston rod rigidly with this body. The trunnions 160 engage bearing blocks 161 capable of some movement longitudinally of the lever arms.

Within the cylinder 155 and between the upper face of the piston 156 and an upper head 188 provided on the cylinder is a helical spring 189 adapted to exert downward pressure on the piston. The lower face of the piston is adapted to be acted upon by a body of liquid permanently held in the cylinder structure and controlled by the movement of a member 190. The member 190 is a small piston or plunger carried at the forward end of a member 191 in the form of a piston reciprocable in a cylinder 192 arranged at right angles to the cylinder 155. On the side of the cylinder 155 is an extension 193 provided with a lateral bore 194 into which the liquid from cylinder 155 can move, this bore 194 receiving with a snug fit the plunger 190. The plunger 190 extends through a suitable packing gland 195 in the extension 193. The piston 191 is fixed to the forward end of a rod 196, the rear end of which rod extends out of cylinder 192 through an adjusting nut 197. A spring 198 is coiled about the rod 196 between a surface on piston 191 and a surface on the nut 197, this spring being compressed when the parts are in the position of Fig. 4 and expanded when in the position of Fig. 5.

Mounted on the rear end portion of the rod 196 is a sleeve 199 carrying a sliding pin 200 adapted to engage a socket 201 in the side of the rod 196. The pin 200 is carried by a small link 202 connected to a lever 203 pivoted at 204 on a lug carried by sleeve 199, the lever 203 being an elbow lever under the influence of a spring on rod 205 supported by a lug 206 projecting from cylinder 192.

The sleeve 199 is connected at each side with a link 207 having a pivotal connection with the sleeve, and the forward end of each link 207 is pivoted at 208 to a branch of a fork or yoke 209 pivoted between the frame walls B and C by means of a pivot rod 210. The pivot rod 210 extends through the wall C, and at the outer side of said wall (Fig. 2) carries a lever 211 pivoted at 212 to an arm or lever 213 operable from the crank shaft F in a manner hereinafter described.

The pivoted yoke 209, when swung to the right from the position of Fig. 5, serves to move back the rod 196, through the connections described, in order to compress the spring 198 and to cock the spring motor, the latter being held in the cocked position by a sliding pin 214 guided in the lower part of the cylinder 192 and engageable in a recess in the piston 191. The pin 214 is withdrawable to release the spring motor, by connections with the control means of clutch device K, in a manner hereinafter more particularly described. Upon withdrawal of the pin 214 the spring 198 is free to act, and in moving the piston 191 forwardly, the plunger 190 is forced forwardly in order to inject liquid into the main cylinder from the external passage 194, and thereby raise the hydraulic piston 156. As this piston is raised, the rear end portion of the duplex lever 144, 145 is elevated to an extent, and the relatively shorter portion in front of the pivots 150, 152 lowered, thereby moving downward the members constituting the duplex connecting rods 140, 141 and 147, 148 at the sides of the ram guide, and the members connected to the lower ends of said rods, including the guide blocks 119 and 120, and the fracture-proofing plate 118 carried by those blocks. In this manner downward movement is quickly imparted to the plate 118, in order to carry a portion 118ᵃ of its lower surface into contact with the upper surface of the work and maintain it against the work under heavy downward pressure, for the purposes hereinafter appearing.

In the particular case illustrated, where the ram carries the cylindrical tool 168, the fracture-proofing plate is provided with a cylindrical opening 118ᵇ receiving the tool with a small clearance. As the profile or size of tool member is changed by replacing the tool member, the opening in the plate will have to correspond, and another plate having the proper opening will be used.

It will be understood that when the plunger 190 is moved to the right from the position shown in Fig. 5, liquid will be permitted to flow out of the main cylinder into the passage 194, and that the spring 189 will then act to force the main piston 156 downwardly, thereby depressing the right-hand end (Fig. 5) of the lever 144, 145, and raising the fracture-proofing plate to the initial position.

It will be apparent that the mechanism connecting the duplex connecting rods 140, 141 and 147, 148 with the slide blocks carrying the fracture-proofing member is such as to permit said member to be micrometrically adjusted toward and away from the forward ends of the actuating lever member, through turning movements given to the operating heads 134 and 135 of the worms 132 and 133. It is, of course, desirable to move these worms uniformly and simultaneously, and for this purpose the duplex hand-wheel-operated wrench device, described in connection with Fig. 17, can be employed, for the wrench shafts of this device will fit the socket heads of the worms, and all that is necessary is some extension of the wrench device from a position such as indicated in Fig. 17 so that the wrench shafts will be brought into line with the respective sockets for engagement therewith. The micrometric adjustment can, therefore, be very easily and conveniently effected.

*The work table*

The die member, cooperating with the pressing tool member and the fracture-proofing element, is carried by the platen N, and the latter is supported on the work table M and is vertically adjustable relative to the work table.

The work table M is mounted for vertical movement, and it is located between the transverse wall T, previously mentioned, and a relatively low wall 215 at the front of the machine.

The main body of the work table M is shown at 216, and it will be noted that this is of rectangular shape and is arranged to move up and down in a correspondingly shaped guide opening formed between the wall T and the front wall 215 and forward portions 217 and 218 of the main frame walls B and C. The guiding of the table is controlled by adjustable gibs permitting it to be adjusted laterally in any direction and to be lined up with the ram. The gibs for the table are preferably of the same kind as those used in connection with the ram, and these gibs are provided with screws engaging threaded sockets in the upper edge of the table-supporting frame. There is a gib 219 at the front of the table, a gib 220 at the rear, and gibs 221, 222 at the respective sides.

In the body of the work table at opposite sides thereof are mounted pivot pins 223 each having an outer bearing 224 and an inner bearing 225 spaced at some distance from the outer bearing. Between each inner and outer bearing a lever 226 has an upper end engaging the corresponding pivot pin and pivoted thereby. Each of the levers 226 has its lower end formed and arranged in the manner shown in Fig. 12, that is to say, it is provided with an opening 227 engaged by an eccentric 228 fixed to and moving with a horizontal shaft 229 the respective ends of which have bearings 230 in a frame member 231 arranged within the lower part of the table-guiding frame.

Within the table-guiding frame in a location below the frame 231 is a forwardly and rearwardly adjustable wedge 232, best shown in Fig. 8, and it will be observed that this wedge has an upper inclined surface 233 engaged with an inclined member 234 connected to and depending from the frame 231. It will be seen that by inward and outward movement of the wedge 232 the vertical position of the frame 231 and the parts connected thereto may be adjusted. This adjustment can be effected by suitable means such as an adjusting screw 235 having a socketed adjusting head 236 at the front of the machine and provided with threads 237 engaging corresponding threads 238 provided in a bore formed in the wedge. When the screw 235 is rotated it is held against longitudinal movement by means including a collar 239 provided thereon, and the rotation of the screw causes the wedge to be moved inwardly or outwardly depending upon the direction of rotation. Inward movement causes the work table to be raised, and upon reverse rotation of the screw the table moves downward by gravity.

In order to counterbalance the work table to a certain extent and facilitate its upward movement when the eccentric lifting mechanism is actuated, suitable means such as helical lifting springs 258 may be employed, these springs being inserted into downwardly facing sockets 259 in the table body and reacting against fixed parts 260 which serve as guides for the vertically slidable member 231 and are bolted to the main frame.

It has been previously stated that at R is indicated a part of the actuating mechanism for lifting or pulsating the work table. This mechanism, in detail, will be described at a later stage, but it may be said at this point that a spring motor employing a longitudinally moving rod 240 is located adjacent the lower outside part of wall C, and that the rod 240 is connected to the previously mentioned shaft 229 for turning the same and thereby lifting and lowering the table. Connection is made from the forward end of rod 240 with a link 241 pivoted by a lever 242 fastened to one end of shaft 229, so that when the rod 240 is moved from the position of Fig. 2 to the position of Fig. 5 the table will be raised through the connections previously described. It will also be understood that vertical adjustment of the table by the wedge 232 will be permitted owing to the character of the connections between shaft 229 and its actuating mechanism.

The platen N is adjustable vertically relative to its supporting work table by hydraulic means, the arrangement being such that for obtaining a precise adjustment the platen is movable upwardly through very small increments. The preferred structure of the hydraulic platen-lifting mechanism will now be described.

Figure 12:
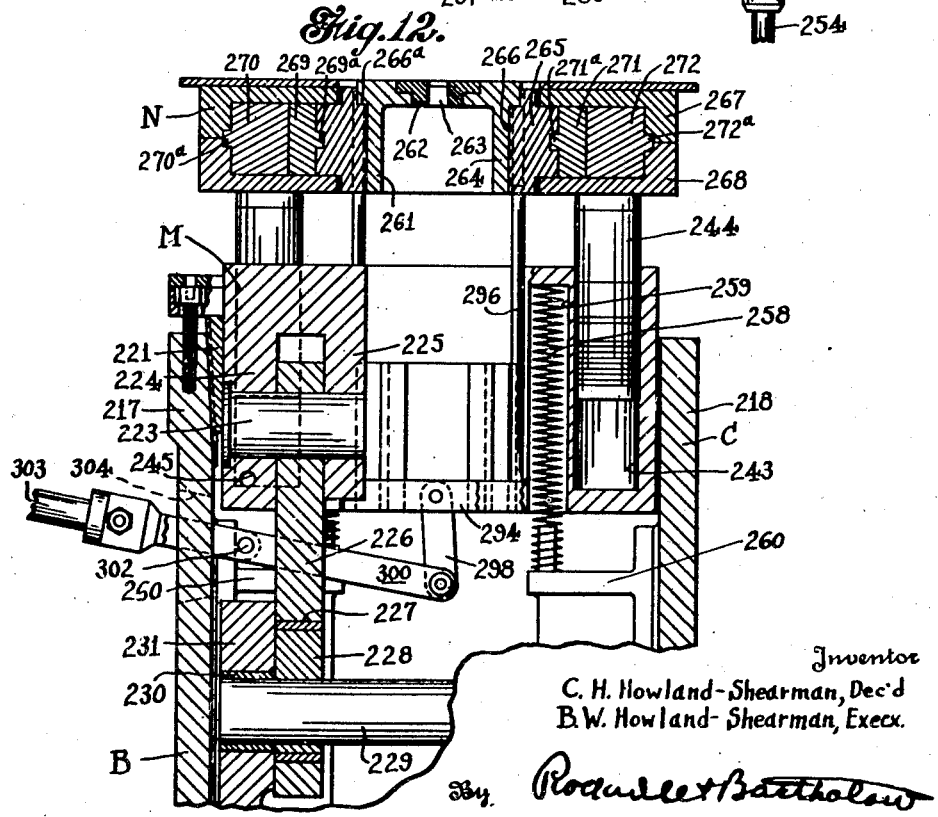
Fig. 12 is a section on line 12—12 of Fig. 11.

At the respective corners of the work table body, small upwardly opening cylinders 243 are formed in the table casting, and in each of these cylinders is an hydraulic piston 244, see Fig. 12, secured at its upper end to the platen N and having a free lower end in the cylinder resting on the pressure liquid of the hydraulic platen-lifting system of which the manually operable hydraulic device S is a part.

Figure 11:
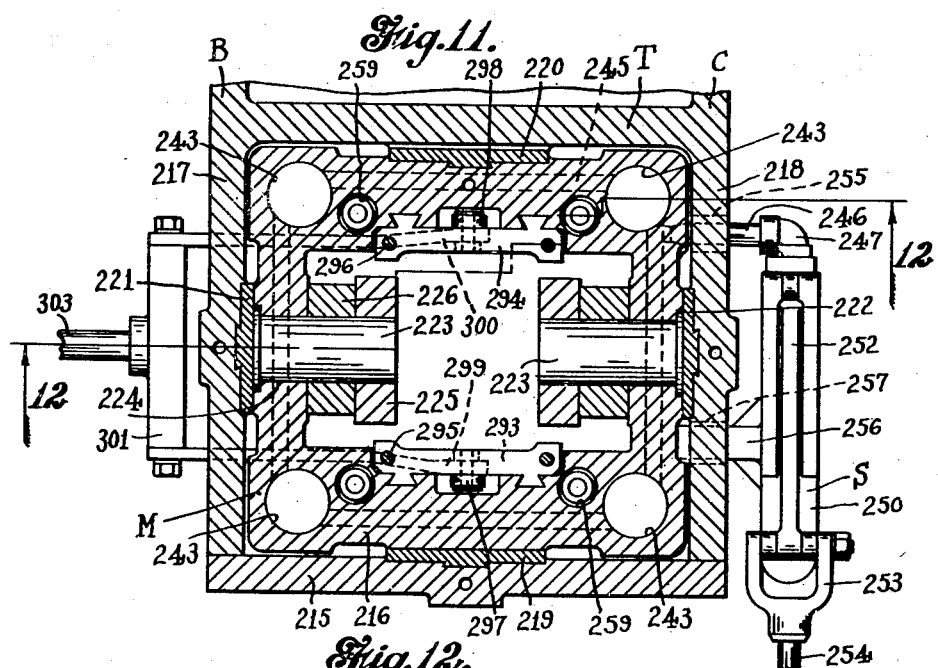
Fig. 11 is an enlarged section on line 11—11 of Fig. 1.

As shown particularly in Fig. 11, each cylinder 243 is in communication at opposite sides with the next adjacent cylinders by way of connecting passages 245 so that there is free intercommunication of the cylinders, and a common supply of liquid is provided by pipe 246, which has a connection with one of the passages 245. Pipe 246 is connected with an elbow 247 forming part of a system of piping 248 having connection with a liquid receptacle or tank 249. The liquid receptacle 249 is also connected with a cylinder device 250 having a movable piston or plunger 251 operable by a link 252, which in turn is operated by an elbow lever 253 having a handle 254. In this manner there is provided a small hand-operable hydraulic pump adapted to pump liquid into the cylinders 243 by small increments as the hand lever is oscillated. These increments may be, for example, of the order of 3/64".

It has been previously pointed out that pipe 246 communicates with one of the passages 245. This pipe 246 passes directly into and is supported from the body of the work table, and it passes to the work table through a slot 255 in frame wall C. This creates a support for the hydraulic pump, piping and tank from the work table itself, and a further support is provided by a part 256 passing through a slot 257, as indicated in Fig. 11. By supporting all of this mechanism from the work table with clearance through the wall of the main frame, the table is enabled to be moved vertically by the wedge 231 to the necessary extent, without interference, the hydraulic control means moving along with the table.

The platen may be raised by small increments by repeated operation of the hand pump plunger 251. In this operation, liquid is sucked out of tank 249 and passes through a check valve device 249a, and through a second check valve device 249b to the piping connected with the pressure cylinders in the work table. As an increased amount of liquid is pumped in, the platen is raised. By the hydraulic means the platen will be supported in an adjustable manner at a predetermined height above the work table body. This enables the platen to be very readily set up for operation of the tool. When it is desired to lower the platen, this can be done by opening a small valve 249c in the piping system, which permits the liquid to flow back into the tank.

The platen N is intended to hold in a removable manner a tool part supporting the work from beneath, and in the present instance the platen serves as a receiving and carrying means for a die plate 261 equipped with a die 262 formed as a removable insert. The die proper in the case illustrated has a through cylindrical opening 263 adapted to receive the punch 168 with a small amount of clearance. For changing dies, an ejecting mechanism for the die plate is provided, as hereinafter described.

The platen is of a character to permit ready and facile adjustment of the die plate in a lateral direction in order that the die may be centered relatively to the cooperating tool carried by the ram. The preferred mechanism by which this result is accomplished will now be described.

The die plate 261 has an upper body or plate proper and depending walls at the sides, the walls preferably being set back somewhat so as to provide supporting shoulders at the under portion of the plate body along the margins. The side walls are indicated at 264. In Fig. 10 the die plate is omitted, but there is shown a rectangular member 265 in the nature of a frame adapted to receive the die plate, and it will be seen that this frame has an opening 266 for receiving the die plate, provided with a marginal shoulder 266a which supports the die plate at the edges.

By referring to Fig. 12, it will be seen that the platen body comprises upper and lower mating members 267 and 268 providing a frame surrounding the frame 265, and mounted within the frame so provided are wedge-shaped adjusting members for adjusting frame 265 laterally. By referring to Fig. 10 it will be seen that an elongated wedge-shaped member 269 is set in the outer frame along one side of frame 265, and that at the outer side of member 269 is a wedge-shaped member 270. It will also be seen that at the opposite side of the inner frame 265 is a member 271 corresponding to 269, and a member 272 corresponding to 270. Each of the members 269, 271 has a face engaging frame 265, and at the opposite side an inclined face cooperating with a similar inclined face on member 270 or 272. At their outer sides members 270 and 272 have tenons 270a, 272a engaging the outer frame, and at their inner faces the wedge members 269, 271 have tenons 269a, 271a engaging the inner frame 265, as best shown in Fig. 12. It will also be noted from Fig. 10 that the slight angle of inclination along which members 269 and 270 interengage is placed oppositely with respect to the angle of inclination at which members 271 and 272 interengage. The result is that if wedge members 270 and 272 are moved in opposite directions to an equal extent (the angles of inclination being the same), the inner frame 265 will be shifted toward the right or the left of the machine, as the case may be.

For accomplishing this result, an adjusting screw member 273, having an operating head 274, may have a threaded shank 275 engaging a correspondingly threaded socket 276 in wedge member 270 for moving said wedge member in opposite directions, depending upon the direction of rotation of the screw, and a connection may be made across to the other wedge member 272 (whereby it is moved to an equal extent in the opposite direction) by a link and lever mechanism such as shown in Fig. 10. In this mechanism a lever 277 is fulcrumed at its middle portion by a fulcrum pin 278, and one end of the lever is connected to member 270 by a link 279. This link is pivoted in a forked portion of the member 270 by a pin 280. A similar construction is employed at the opposite end of lever 277, link 281 corresponding to link 279, and pin 282 corresponding to pin 280. Clearance recesses are provided in the ends of the wedge members 269 and 271 so that lever 277 will have no interference in its swinging movement.

The adjusting mechanism for the inner die-plate-carrying frame also provides for the adjustment of the frame in a forward and rearward direction with respect to the machine, and this result is preferably achieved by elements best shown in Fig. 10, where a short link 283 is connected with a screw-operated adjusting lever 284. The link 283 is pivoted to the frame 265 at the central front portion by a pivot member 285, and the link is pivoted to lever 284 by a pivot member 286. The lever 284 is pivoted to the platen body at one end of the lever by a pivot member 287, and at the opposite end of lever 284 a screw 288, similar to screw 273, is used for shifting the lever. The connection of the link 283 to the lever is near the pivot 287, so that as the free end of lever 284 is shifted, the frame 265 has a movement of much less amplitude, whereby a very fine adjustment of the frame can be produced, especially if the threads of screw 288 have a fine pitch. The threads on the shank of the screw 288 engage an interiorly threaded socket 289 carried by the platen body. The screw has a cylindrical portion 290 extending with clearance through a perforation in the end portion of lever 284, and collars 291 and 292 carried by the screw adjacent the front and rear surfaces respectively of the lever provide for the positive movement of the lever in opposite directions by the screw without lost motion.

It will be understood that the mechanism just described provides for a very precise forward and rearward adjustment of frame 265 between the ways constituted by the members 269 and 271. In conjunction with the previously described adjusting means, whereby the frame can be adjusted very precisely toward the right or left of the machine, there is provided a universal adjustment for the frame in a horizontal plane so that, within certain limits, it can be centered at any desired point. For these adjustments, individual operation of the screws 273 and 288 is effected, and these screws are preferably provided with hexagonal heads 274 and 288ª adapting them for quick and easy operation by a socket wrench.

For facilitating changing of the die plates carrying different dies, the work table preferably has associated therewith a die plate ejector mechanism, and this may be of the character shown particularly in Figs. 11 and 12, where there is illustrated a vertically moving ejector element guided in the table body and operable by a lever having a handle accessible at one side of the table. The ejector slide in this form is of duplex character, involving parts 293 and 294 guided in the front and rear portions respectively of the table body. These parts 293 and 294 preferably have dove-tail ribs engaging correspondingly formed grooves in the table body, as shown in Fig. 11. The part 293 carries at the ends upwardly extending ejector rods 295, and the part 294 carries similar rods 296, so that in all, four rods are provided adapted to engage under the corner portions of the die plate and to lift the die plate out of the platen when the parts 293, 294 are moved upwardly for that purpose.

At their lower portions the parts 293, 294 have connected to them links 297, 298 respectively, pivoted at their lower ends to branches 299, 300 of a U-shaped lever frame 301 pivoted by means of pivot members 302 to two of the parts 260 previously mentioned. The outer ends of the lever branches 299, 300 are disposed exteriorly of the table guide, and an operating handle 303 is furnished for the lever. The lever branches or arms operate in slots or cut-out portions 304 in the frame wall B, and these slots or cut-out portions enable the table frame to be raised and lowered without interference when the wedge 232 is adjusted.

It will be noted that the central portion of the work table body, beneath the die plate, is left open, as indicated particularly at 305 in Fig. 8, so that metal slugs or pieces ejected downwardly out of the die (in case an open die is used) can drop through the table body. Within the lower table structure a fixed discharge chute 306 is provided, which catches the pieces and diverts them to a discharge opening 307 in the front wall of the table guide. This chute has an upper portion 308 of less inclination than the remainder of the chute, extended at its upper end into close proximity to the inner surface of the table body, and the chute is effective in the various positions which the table body may assume when pieces are issuing from the die.

*The mechanism for pulsating the work table*

The mechanism indicated at R, whereby the work table is pulsated by rotation of the shaft F, will now be described.

It will be noted from Fig. 7 that the shaft F has a suitable bearing in frame wall C, indicated at 309. Beyond this bearing at the outer side of the frame the shaft is of reduced cross section, as shown at 310, and at this point the shaft has keyed to it an eccentric 311 adapted to rotate in a bearing aperture 312 formed in the enlarged end portion of a pitman 313. At the opposite end of the pitman, the same has a forked portion 314 pivoted by means of a pivot pin 315 to the upper end of a lever 316 pivoted intermediate of its ends on the outer side of the wall plate C. The intermediate pivot for lever 316 is adjustable for the purpose of adjusting the throw of the lever, and in the form shown this pivot is provided by pivot means adjustable relatively to a longitudinal slot 317 in said lever 316 and passing through said slot and adapted to be clamped in any of a number of different positions in a projecting vertical guide 318 fixed on the frame wall. The pivot member for the lever, adjustable in this fashion, is indicated at 319, and it is adapted to be clamped in the desired location in the groove of guide 318 by means such as a hand wheel 320. It will be understood that if the pivot 319 were adjusted downwardly in guide 318 to a point lower than that shown in Fig. 2, the amount of throw of the lower end of lever 316 caused by rotation of the shaft F would be decreased.

At the lower end of lever 316, a pivot 321 connects a short link member 322 to the rear end of a carrier element 323, connection with the link being made by means of pivot 324. The carrier member 323 has an interior bore open at the front end, by means of which bore it is fitted over the rear end of table-moving rod 240, previously mentioned. The carrier member 323 is also provided with a lateral projection 325 in which slides a detent member 326 adapted to engage at its inner end with a recess 327 in the rod 240. The detent member 326 is urged in the direction of the recess 327 by means of a coil spring 328 coiled about the shank of the detent member. The detent member at its upper end has a head 329 located in a longitudinal guide 330 in a vertically movable member 331. The head of the detent is held in the guide 330, and the shank of the detent extends down through a slot in the lower member of this guide, and the spring 328 is confined between the lower surface of the guide and a shoulder on the detent member 326. The arrangement is such that, in different positions of the head 329 in the guide 330, the detent slide or pin will be continually pushed toward rod 240 to be in position to engage the detent recess 327 thereof.

The rod 240 is mounted for forward and rearward sliding movement relatively to the frame wall C by means of a guide structure including a bracket or frame fastened to the frame wall and comprising a fixed rear bracket member 332, and a fixed forward bracket member 333. The rod 240 extends through and is guided in a lengthwise adjustable threaded sleeve 334 engaging a threaded bore in bracket 332. At opposite sides of the bore in 332, this bracket has rigidly fastened thereto forwardly extending guide rods, there being an upper guide rod 335 connecting bracket 332 with bracket 333, and a lower guide rod 336 rigidly fixed to the bracket 332. Slidable along these guide rods 335, 336 is a cross head 337 to which the forward end of rod 240 is secured in a suitable manner. A coil spring 338 surrounds the rod 240 between the cross head 337 and the bracket 332 and is adapted to be compressed when the cross head 337 is in the position shown in Fig. 2, and is adapted to be extended, as shown in Fig. 5, to move the rod 240 forwardly to the position shown in Fig. 5, for raising the work table.

The connection of the rod 240 with the link 241 of the table-raising mechanism is made by means such as a pin 339 carried by a lug 340 suitably secured to and projecting forwardly from the rod 240, and the rod 240 has a removable connection with the cross head 337 comprising a threaded plug 341 engaging a threaded bore in the cross head. When it is desired to change the spring acting on the rod 240, link 241 can be detached and the rod, with the spring embracing it, drawn forwardly out of the cross head. A stronger or weaker spring can then be substituted.

The clutch

Figure 15:
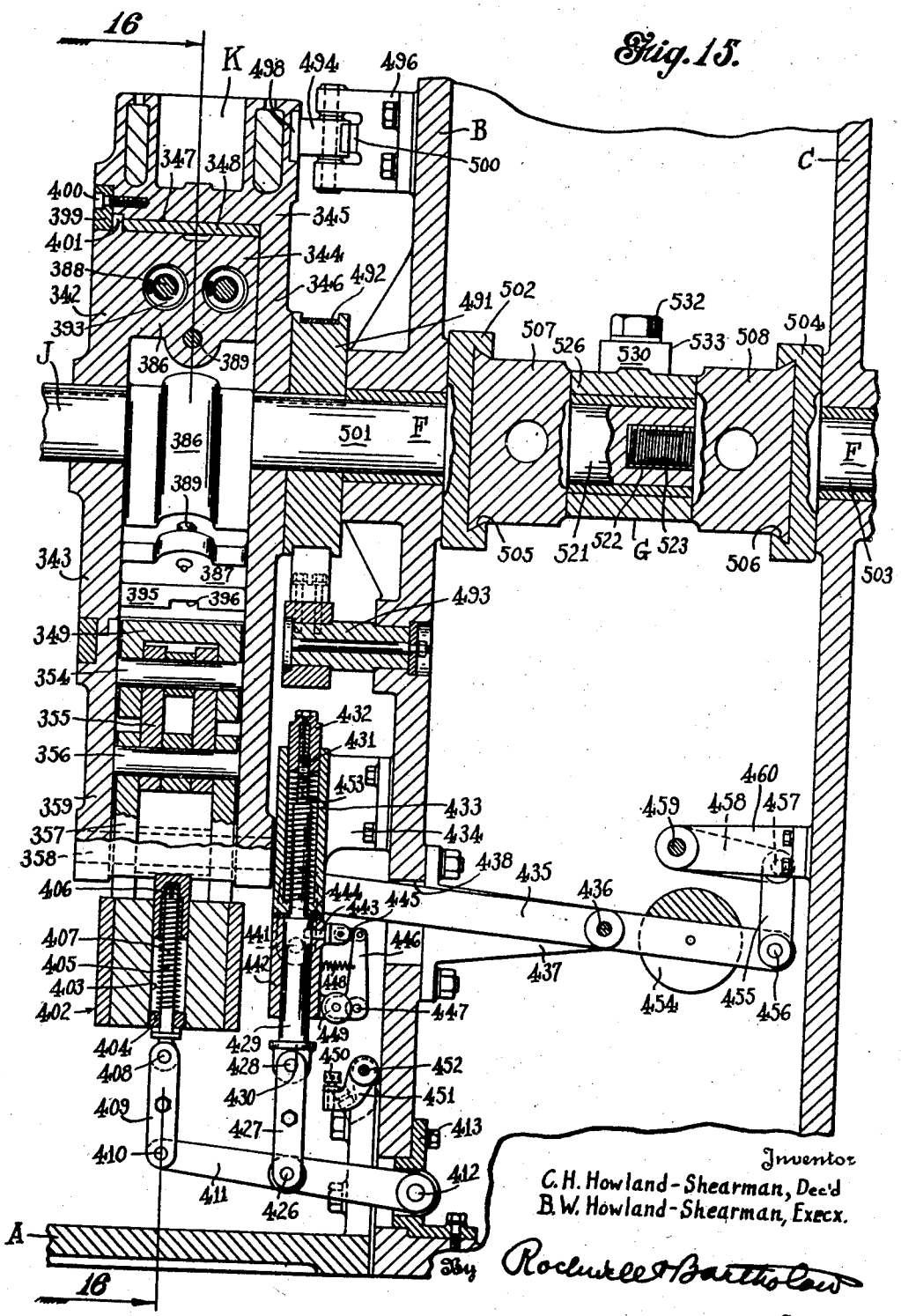
Fig. 15 is a section on line 15—15 of Fig. 4.

The clutch K, by means of which shaft F is driven, is preferably of the construction shown in Figs. 15, 15A and 16.

Keyed to the end of shaft J (Fig. 15) is a driving clutch member 342 having a wall 343 by which attachment is made to the shaft and provided with a number (in this case, three) of axial extensions 344 which serve as interlocking members, in the manner hereinafter described. Disposed about the driving member 342 is a hollow body 345 having a wall 346 by which it is keyed to the left-hand end (Fig. 15) of shaft F. The body 345 is provided with a round recess 347 for receiving member 342, and inside the cylindrical wall of the recess is a partly circular bearing ring 348, fixed in a suitable manner within the hollow body.

The hollow body 345 is preferably of elongated shape and has slidably mounted in the lower part thereof (in the position of Fig. 16) a bolt member 349 adapted to be projected into any of the spaces between the axial members 344. The bolt member 349 is guided for in and out movement in a guide 350 of the hollow body and the bearing ring 348 has a cut-away portion 351 at the inner end of this guide. The bolt member 349 is provided at its inner face with a locking part 352 to engage the driving member in a manner hereinafter described. At its rear or outer part, the bolt member 349 is recessed, as shown at 353, and has pivoted therein, by means of a pin 354, duplex levers 355, the outer ends of which are pivoted by means of a pin 356 to duplex elbow levers 357. The elbow levers 357 are fixedly pivoted in the hollow body by a pin 358. The pin 358 has one end engaged with the wall 346 of the hollow body, and the other end of the pin engages a facing wall portion 359 of the hollow body. The outer ends of the elbow levers 357 are in projecting relation to the hollow body and each such end carries a roller 360 adapted to cooperate with a suitable stop, as hereinafter explained.

On the movable joint pin 356 is mounted the inner end 361 of a rod 362 whose outer end portion slides through a rockable ball member 363 socketed in a member 364. Between the ball member 363 and the inner end of the rod 362, a helical spring 365 is arranged. The inner end portion of the rod 362 is provided with a socketed portion 366 with the bottom of which the spring 365 is engaged. The inner end portion of the rod 365 is also provided with a small projection 367 adapted to engage a resilient stop member 368. The stop member 368 preferably comprises a cylinder 369 resiliently mounted by means of a sliding spring-pressed screw member 370. The projection 367 is adapted to engage a pad 371 fixed on the inner end of the cylinder 369.

The bolt member 349 may be locked in inoperative position by the means shown in Fig. 16, said means including a laterally sliding member 372 guided in a bore 373 of the hollow body and carrying at its forward end a projection 374 adapted to engage a small recess 375 formed in the side of the bolt member 349. To the sliding member 372 is pivotally connected at 376 a rod 377 pivoted at 378 to the lower end of a lever 379, the upper end of which lever is fixedly pivoted to the hollow body or outer clutch member by means such as a pin 380. A coil spring 381 is confined between a collar 382 on rod 377 and a plug 383, and the tendency of the spring is to force the projection 374 into the recess of bolt member 349. Lever 379, previously mentioned, carries intermediate its ends a forwardly projecting part in which is mounted a small roller 384 and this roller is movable in and out to a limited extent in a cut-away portion 385 of the bearing ring 348, the outward movement of the roller in said cut-away portion being caused by the movement of the inner or driving member of the clutch, as will be described later on.

The axially projecting locking portions 344 of the inner or driven member are so constituted and arranged as to provide for cushioning the clutch and taking up shocks, and to this end the preferred construction is as follows: Each of the axial extensions is made up of two principal parts, namely, a fixed main part 386 rigidly attached to the driving member (as by being made integral therewith), and a smaller member 387 resiliently supported from the member 386 as by means of one or more springs. The member 387 is the one which is adapted to be engaged by the bolt member 349, and by mounting the member resiliently, the clutch is caused to take hold gently, the shocks incident to interengagement being overcome. In the form shown, each member 387 is in the nature of a cross head rigidly attached to two parallel supporting spindles 388 and 389, each of which spindles is supported and guided lengthwise in the corresponding supporting member 386. In this form, the rear ends of the spindles 388, 389 are provided with heads 388a and 389a, and these heads fit and are guided lengthwise in sockets 390 and 391 respectively in the supporting member. About the major portion of spindle 388, the supporting member is cut away to provide a spring socket 392, and within this socket is a helical spring 393 adapted to be compressed as the member 387 comes into contact with the bolt member 349, allowing the member 387 and its support to have movement rectilinearly with respect to each other, in order to absorb any shock or blow incident to the interengagement.

For engaging each of the coacting members 387, the locking face of the bolt member 349 presents a shoulder 394 at one side and this shoulder, which is preferably arranged at a slight angle, as shown in Fig. 16, is adapted to engage a correspondingly formed shoulder 395 at the peripheral portion of the coacting member 387.

The members 387 are provided with median recesses 396 to clear the roller 384, in order that they may have no effect on the roller. The supporting members 386 have median grooves 397 throughout a major portion of their length, providing clearance for the roller 384, but at a certain point in their length they have rounded portions or bumps 398 (these being located adjacent the front ends of the grooves 397) which engage the roller as they travel over the same and thereby cause the bolt member 349 to be disengaged by its latch.

The inner or driving member of the clutch is held in position with respect to the outer member by suitable means such as a ring 399 of suitable bearing material attached to the outer clutch member by screws 400, said ring being set in a recess formed partly in the outer member and partly in the inner member, as shown in Fig. 15. This ring 399 may bear against a flange 401 on the inner member, and the flange 401 may bear against the edge of the bearing member 348, as shown in Fig. 15.

Cooperating with the outwardly extending ends of the elbow levers 357 is a stop member located extraneously of the clutch and adapted to be placed in and withdrawn from blocking position with respect to the elbow levers. This stop member is indicated at 402 and the blocking position is shown in full lines in Fig. 16, the movement to releasing position being indicated by dotted lines. This stop member 402 is movable vertically under the control of the lever mechanism shown in Figs. 15, 15A and 16. The stop member is generally of block-like character and presents a through opening 403, the lower end of which is closed by a plug 404. Through an opening in the plug a spindle 405 passes into the interior of the block, and on the upper end of this spindle is screwed a cap-like member 406. A spring 407 is arranged between the cap-like member and the plug 404, the tendency of which spring is to hold the spindle 405 in the position shown in Figs. 15 and 16, the said spring being a compression spring. To the lower end of spindle 405 is connected, by means of a pivot 408, a pair of links 409, the lower ends of these links being pivoted by means of a pin 410 to one end of a lever 411, the opposite end of said lever being pivoted to the frame by means of a pin 412 and a bracket 413, said lever being adapted to swing in a plane parallel to a vertical plane passing through the clutch axis.

The bracket 413 may be attached to the frame wall B at the lower part of the wall.

The stop member 402 is movable vertically alongside a fixed bracket member 414 (Fig. 16) supported from frame wall B in a suitable manner, and in the position of Fig. 16, the stop member is locked relatively to this bracket by means such as a small sliding pin 415 movable laterally in the stop member and adapted to engage a small locking recess 416 in the bracket. This pin 415 is connected by a small link 417 with the upper end of an elbow lever 418 pivoted within the stop member by means of a pivot pin 419, and a spring 420 acting against the free end of the elbow lever tends to hold the locking pin 415 in locking engagement with the bracket.

That part of the stop member 402 which is engaged by the duplex elbow lever element of the clutch has a free lateral side face, and that face is preferably provided with a resilient pad 421 with which the rollers of the elbow lever come in contact. The active side face portion of the stop member is preferably adjustable in a lateral direction, and this result may be brought about by providing an arrangement such as shown in Fig. 16, where the part 422 of the stop which carries the pad 421 is shiftable laterally with respect to the remainder of the stop by causing vertical movement of a wedge member 423. This wedge member may be raised or lowered by the rotation of a spindle 424 having a threaded shank 425 engaging an interiorly threaded socket in the wedge member.

Intermediate of the ends of the lever 411 a pivot member 426 is located, by means of which duplex upwardly extending links 427 are connected to the lever, and at the upper end of these links they are pivoted by means of a pivot 428 to the lower end of a spindle 429. This spindle has a collar 430 adjacent its lower end, and at its upper end, which is of reduced cross section, it is threaded as shown at 431, and this threaded portion engages a correspondingly threaded socket in a spring stop or plug 432. The upper end portion of the spindle is guided vertically in a sleeve 433 carried by a bracket 434 mounted on frame wall B, and the spring stop or plug 432 is set in the upper part of this sleeve. As will be seen from Fig. 15A, a lever or walking beam 435 is pivoted intermediate its ends by means of a pivot 436 to a bracket 437 projecting from wall B. The lever 435 extends through a cut-away portion 438 in wall B, and its left-hand end (Fig. 15A) is bifurcated and pivoted by means of pivots 439 to short links 440, the lower ends of which are pivoted by means of pivots 441 to a sleeve member 442 embracing the lower larger-diametered part of spindle 429. Sleeve 442 is adapted to be fixed in position longitudinally with respect to spindle 429 by locking means such as a laterally sliding locking pin 443 mounted in the sleeve and adapted to engage a locking recess 444 in the side of the spindle. The head of the pin 443 is pivoted by a short link 445 to an elbow lever 446 pivoted on the sleeve 442 at 447. A spring 448 tends to hold the pin in the inward locking position. A roller 449 is carried by the lower free end of the elbow lever 446 and is adapted to engage an adjustable screw 450 carried by a lever 451 pivoted adjacent wall B at 452.

Within the sleeve 433 is a coil spring 453 resting at its lower end against the bottom of the sleeve and engaged at its upper end with the spring stop 432. This is a compression spring which acts against the spring stop in an upward direction, and has a tendency to hold the spindle 429 in the position shown in Fig. 15.

On the right-hand end portion of the lever 435 (Figs. 15 and 15A), a weight 454 is supported, this weight being used for counterbalancing purposes.

At the right-hand extremity of lever 435 (Figs. 15 and 15A), an upwardly directed short link 455 is pivoted at 456, and the upper end of link 455 is pivoted at 457 to the free end of a lever 458 projecting rigidly from a rock shaft 459 mounted in a bracket 460 projecting inwardly from wall C.

From the rock shaft 459 is extended a rigid arm 461, the end of which is pivoted to the lower end of a long link 462, the upper end of which is pivoted at 463 to the end of a lever 464 pivoted intermediate of its ends at 465 in a bracket 466 projecting inwardly from wall C. The opposite end of lever 464 is pivoted to a duplex link 467 which is pivoted at its upper end, as indicated at 468, to the sliding pin 214, previously described, that locks in the cocked position the spring plunger associated with the hydraulic-operated fracture-proofing device.

From rock shaft 459 connection is also made from the clutch-controlling mechanism to the spring motor by which the work table is lifted. From the front end of the rock shaft, a lever 469 is extended through a slot 470 in wall C. The free end of lever 469 is connected by pivot 471 to a pair of links 472, said links being pivotally connected at 473 in a box-like structure 474 attached to part 331 and mounted to slide up and down at the outer side of wall C. Preferably, the box-like structure 474 is guided in upper and lower guides 475 and 476 engaged respectively by upper and lower guide rods 477 and 478 projecting from the box-like frame.

At the lower end of rod 478, connection is made to the pedal device L. The pedal device may comprise a foot piece 479 rigidly carried by and projecting forwardly from rock shaft 480 having an upwardly extending arm 481 and a downwardly extending arm 482, the latter arm being acted upon by a suitable spring 483 which normally holds the pedal in the position of Fig. 2. The upper arm 481 is connected by a long link 484 to an elbow lever 485 pivoted on wall C at 486 and connected by links 487 to a sleeve 488 adapted to be locked to the lower end of rod 478 by a spring-controlled detent device 489 similar to the detent device associated with sleeve 442 and previously described herein, said detent device being adapted to be released by engagement with an adjustable stop 490 on the frame wall C, as hereinafter described.

In the operation of the clutch, the shaft J rotates in the direction of the arrow shown in Fig. 16, carrying with it the driving member and its resiliently supported engaging or abutment members 387 which, by their mounting on the spindles, are adapted to have independent cushioned movement along chords of a circle. In Fig. 16, the clutch is shown in the position in which the driving member is rotating freely and the outer driven member held from rotation by the stop located in the path of the projecting elbow lever. In the position shown, the roller 384 is being contacted by one of the bosses or projections 398, and the bolt member 349 is released from its latching projection and tends to move inwardly under the action of spring 365, but is prevented from moving inwardly by the engagement of the outer end of the duplex elbow lever with the stop 402. The spring 365 tends to straighten or align the toggle consisting of the upper arm of the elbow lever 357 (Fig. 16) and the lever 355 connecting it to the bolt member.

When the clutch pedal is depressed, one of the effects brought about through its associated linkage, as hereinafter more particularly described, is the lowering of the stop member 402 out of the way of the projecting elbow lever of the driven member. As soon as this takes place, the spring 365 is free to act to move bolt member 349 inwardly and this takes place very rapidly with a snap action, the toggle straightening practically instantaneously and carrying the bolt member 349 into the path of one of the engaging members 387. The shoulder 395 of this engaging member is thereupon resiliently engaged with the shoulder 394 of the bolt member, and the support of the engaging member comes up behind it in a cushioned manner and the bolt member is carried around and with it the outer clutch member and its shaft F and connected mechanisms.

When the toggle in the outer clutch member is straightened, its projection 367 comes into contact with the resiliently supported pad 371 which acts as a cushion.

Associated with the driven member of the clutch at the outer side thereof is a suitable braking device, shown as comprising a pulley 491 encircled by a brake band 492 held under adjustable tension in a suitable manner by means including a post member 493 suitably supported on wall B.

For restraining the rebound of the driven member of the clutch after the driven member has been released from the driving member, a pawl device, such as shown particularly in Fig. 24, may be employed. This device comprises a lever 494 pivoted intermediate of its ends at 495 on a bracket 496, and having a toothed extremity 497 adapted to engage a projection on a hardened insert 498 on one of the side faces of the driven member. The engaging end of the lever 494 is acted upon by a spring 499. Associated with the other extremity of the lever is a cushioning stop 500 of suitable structure.

The release of the driven member of the clutch is, of course, caused by the upward movement of stop member 402 into a position in which it will be struck by the projecting duplex elbow lever. At this time, the end of the elbow lever, instead of having the generally perpendicular arrangement with respect to the driven member, shown in Fig. 16, is located at an acute angle. As soon as the elbow lever comes into contact with the pad on the stop, pivotal movement of the elbow lever is effected against the action of spring 365 (which, incidentally, takes up some of the shock) and the bolt member 349 is quickly drawn to the disengaged position. The driven member of the clutch is then quickly arrested by the brake band, and rebound prevented by the pawl device.

The micrometer crank

The adjustable crank, generally indicated at G, and the operating device for the micrometer adjustment, generally indicated at Q, will now be described. There will also be included a description of the provisions whereby the length of the connecting rod or pitman D' is automatically adjusted to compensate for the adjustment in the throw of the crank.

As shown particularly in Figs. 7 and 15, the shaft F, with which the crank is associated, is made in two parts, one of these parts comprising a shaft section 501 rigidly carrying a transverse guide 502, and the other having a similar shaft section 503 and a similar guide 504. The section 501 extends to and is connected with the driven member of the clutch K, and the section 503 is the one having a bearing in the frame wall C and provided with the reduced extension 310 previously mentioned. The guides 502 and 504 are each arranged so as to extend diametrically from the shaft at opposite sides to approximately equal extents, and each of these guides has a guideway of dove-tail cross section at its inner face, the guideway of 502 being indicated at 505 and the guideway of 504 being indicated at 506.

Referring to Figs. 7 and 15, it will be seen that a guide block 507 is guided forwardly and rearwardly in guideway 505 and a similar block 508 is guided in guideway 506. These guide blocks are adapted to be adjusted in the guideways by adjusting screws having shanks passing through lugs 509 and 510, respectively, carried at the forward ends of the guides. These screws are shown respectively at 511 and 512, and it will be seen that they have smooth neck portions rotating in smooth bores in the lugs 509, 510, and collar portions 513, 514, respectively, located against the lugs, and threaded shank portions 515, 516, respectively (both having left-hand threads), engaging correspondingly threaded sockets 517, 518 in the guide blocks. Rotation of spindle 511 can be brought about by rotating a spur gear 519 located in front of collar 513 (Fig. 7), and a similar spur gear 520 serves to rotate spindle 512.

In order to provide between and in association with the guide blocks a crank pin rigid therewith, it is preferred to adopt the construction shown in Fig. 7, in which block 507 intermediate of its ends carries an integral laterally projecting pin member 521 extending to the inner face of the other block and provided at its outer or free end with a threaded socket 522 in which is engaged a threaded stud-like integral extension 523 from a face of the other block 508.

The part 521 constitutes essentially a cylindrical crank pin member extending between and rigidly interconnecting the two slide blocks. Around this member is a split sleeve 524 of suitable bearing material which assists in providing on the crank pin a bearing for the rear end portion of the connecting rod or pitman D'. For the major portion of its length, the member D' is constituted by a round rod 525, to the forward end of which is connected the coupling member 45, 46 previously described. At the rear end, the connecting rod is extended by providing a member 526 suitably fastened to the rod portion and utilized for connection with the crank pin member at the rear. The part 526 may advantageously be in the form of a block having in its front end a threaded socket 527, into which a threaded reduced portion 528 on the rear of rod 525 is engaged. The threads on portion 528 are right-hand threads, that is to say, of opposite hand from the threads on the spindles 511, 512.

Within the rear portion of block 526 (Fig. 7) is pierced an aperture of suitable form. Immediately behind the split sleeve (Fig. 7) in this aperture is a supporting block 529, which block is adapted to be adjusted forwardly by an adjacent wedge 530 movable transversely in the rear end portion of block 526 by means of a screw 531 having a head 532 abutting against a flange 533 on the wedge and provided with a threaded shank portion engaging a correspondingly threaded socket 534 in block 526.

In the normal operation of the machine, the adjustable crank and the adjustable connecting rod may have the relation to the adjacent machine parts shown in Fig. 6, where the actuating means Q, used for adjustment, is in the inoperative position. Fig. 7, on the other hand, shows this actuating means in the operative position. When this means is operative, a spur gear 535 associated with the connecting rod and serving for turning the spur gears 519, 520, is meshed with these last-named gears. The spur gear 535 is splined to the rod member 525 by a spline 536 and said gear 535 carries at the forward side a collar 537, by means of which gear 535 may be moved to operative position lengthwise of rod member 525 against the action of small coil springs 538, 539, which normally hold the gear 535 in the forward position of Fig. 6. Rearward movement of gear 535 may be effected through an elbow lever 540 pivoted on a bracket 541 extending inwardly from wall C, said elbow lever 540 carrying at its inner end a roller engageable with the collar 537. At the opposite end of the elbow lever 540, the latter is connected by a small link 542 to a pin 543 slidable in and out in a hole in wall C and attached rigidly at its outer end to a push pad member 544. This push pad member 544 is in the nature of a bridge, being supported at one end by the pin 543 and at the opposite end by a pin 545 sliding in a hole in wall C and serving as a partial support for a gear carrying yoke 546. The yoke 546 is also supported by a shaft 547 sliding in a hole in wall C at one side of pin 545 and having attached thereto at its outer part, beyond wall C, an operating hand wheel 548, whereby rotation of the gears supported on yoke 546 is effected.

On yoke 546 a short shaft 549 is mounted in suitable bearings, and between these bearings this short shaft carries a spur gear 550 engageable with a larger spur gear 551 rigidly fixed to rod member 525 of connecting rod D'. Fixed on one end of the shaft 549 is a bevel gear 549ª engaging a bevel gear 547ª fixed to the inner end of shaft 547.

It will be seen from Fig. 6 that in the inoperative position of actuating mechanism Q, the yoke 546 will lie against the inner face of wall C, and that the push pad 544 will be located some distance outwardly from wall C. In order to place the adjusting means in position (the high-pressure linkage being in the position of Fig. 4), it is merely necessary to release a locking lever 552 associated with shaft 547 (for locking it in or out as may be desired) and push in the push pad 544 to the position of Fig. 7. This will cause the gear 535 to be moved into mesh with the gears 519, 520, and the gear 550 will be meshed with gear 551. Then, by turning hand wheel 548 in the proper direction, rod member 525 can be rotated to shorten the crank and lengthen the connecting rod, or to lengthen the crank and shorten the connecting rod. The rod member 525 is free to turn with respect to the coupling member 45, 46, and is held against lengthwise movement with respect to the coupling member by being provided with an enlargement or head 556 interposed between parts 45 and 46 and fitting a socket 557 in part 46. The coupling members 45 and 46 are preferably interconnected by means such as screws 558.

A very fine and precise adjustment can be obtained, owing largely to the use of the screws employed for shifting the crank pin and for shifting relatively to each other the parts of the connecting rod structure. Also, attention is called to the provision of the reduction gear between the hand wheel 548 and the connecting rod gear 551, this being a further provision enabling an extremely precise adjustment to be made.

It will be evident that after use of the actuating mechanism Q in the relation shown in Fig. 7, this actuating mechanism can be very easily and quickly restored to the inoperative position shown in Fig. 6.

It will be manifest that as the blocks of the adjustable crank are adjusted by spindles of opposite thread to the thread used on the spindle which adjusts relatively to each other the sections of the connecting rod, the adjusting device as a whole is self-locking and it is unnecessary to perform a special operation for locking the parts in the positions to which they have been adjusted. Adjustment is very facile and convenient, as it is merely necessary to move into position the actuating mechanism Q, turn the hand wheel to the proper extent, and then move the actuating mechanism back to the inoperative position. It is also extremely easy to ascertain the position of the crank-adjusting mechanism at any given time, owing to the fact that an indicating device for this purpose is preferably located in a position at the exterior of the machine, where it is conveniently visible. In the present instance, a scale and pointer device U is associated with the wall C at the exterior thereof, the pointer having connected thereto at the back of the frame wall a lever 553 connected by a link 554 with a lug 555 projecting upwardly from the connecting rod member 526. It will be obvious that as the length of the connecting rod is adjusted, the pointer and scale device U will act to indicate visually the extent of the adjustment.

*Operation of the high-pressure linkage*

In the operation of the high-pressure linkage, the tractor levers 41 and 44 are brought to the infinite-plane position of Fig. 4 preliminary to commencing the operation of the ram-carried punch or other tool upon the work. At this stage, the connecting rod D' and the crank mechanism G have the positions shown in Fig. 4, the crank pin member 521 being at the left-hand dead center. The clutch K being engaged and the crank device G being rotated in the clockwise direction (Fig. 4), the connecting rod is pulled rearwardly of the machine to operate the tractor levers, the lower lever swinging on its lower fixed pivot, and the upper lever swinging on its upper pivot member which concurrently moves downward in the fixed guide in the frame. As this movement of the upper tractor lever occurs, its forward extending or tool-beam portion swings downward relatively to the axis of the upper (downwardly moving) pivot, thereby causing downward movement of the ram link 69 and of the ram, the latter having rectilinear movement in its guide.

At the moment when the connecting rod commences its pull upon the tractor levers, the latter being in the infinite-plane position, enormous downward pressure is exerted on the ram, there being at the start of the movement a pressure which theoretically is infinite. As the pull on the intermediate pivot or knuckle pin of the tractor levers is continued and the angle between the levers becomes greater, the downward movement of the ram speeds up progressively up to a certain point, and, in some cases, there may be continuous increase of speed (with decrease of power) throughout the action of the tool on the work, whereas in other cases there may be a progressive decrease of speed (with increase of power) toward the end of the tool action on the work. This will depend upon the thickness of the work piece, and upon the adjustments in respect to ram stroke, etc., which have been made in the mechanism to adapt it to the intended operations.

In practice, the machine is usually so constructed that in the right-hand dead-center position of the crank pin (Fig. 5), the angle between the tractor levers and the vertical will not be materially in excess of 10 degrees.

It will be evident that toward the end of the stroke of the ram, the crank will be near the right-hand dead center, and that, as this occurs, the linear movement of the connecting rod, and, therefore, the swinging movement of the tractor levers, will be slowed down, with consequent and corresponding increase in the tractive effort of the crank pin, which may be such as to cause a progressive increase of pressure on the ram toward the end of the stroke. This feature is of great value in connection with such metal-forming operations as cold forging, coining, or the like, where at the end of the stroke an increase of pressure in relation, say, to the mid-stroke pressure, or the pressure at another intermediate point, is desirable.

In connection with the operation of the high-pressure linkage, the diagram of Fig. 22 is of interest, and this view shows, among other things, how, in the novel machine, an ample ram stroke is provided for, while at the same time a very short operating crank is required, both of these results being eminently desirable. This diagram also emphasizes the simplicity of the novel slide lever arrangement.

In reference to the diagram, Fig. 22, and particularly the slide lever mechanical motion having the features previously described in connection with the machine structure, the following observations may be made:

I. The anchor lever $a$, joined by the knuckle pin $k$ to the slide lever $b$ is oscillated on the fixed fulcrum $f$ by a force $w$ to an angle as $\theta$, at which angular position it has pulled down the slide $s$ through the top pin $k'$, in its fixed guide $g$, by a force of $$\frac{\cos \theta}{2 \sin \theta} \times w = w'$$

II. Assuming the anchor lever $a$ has a radius $r$ and the slide lever $b$ an equal radius $r'$, the slide $s$ has now been pulled down by a stroke = $r \times$ func. vers. $\theta$ = dim. vers. of $a$, + $r' \times$ func. vers. $\theta$ = dim. vers. of $b$, making up the double dimensional versed sine constituting the composite slide stroke $s'$, and the working pull on the slide $s$ during such stroke is $s' \times w' = s'w'$.

III. The slide lever $b$ bears integrally at 90° to its longitudinal axis a forward projection $b'$, having a radius $r''$, as compared with the radii $r$, $r'$ of the mutually articulated slide lever $b$ and anchor lever $a$. Therefore, said projection inherently has a kinematic ratio of $r'' \div r$ with respect to said slide lever $b$, which we may term its K. R., and a kinetic efficiency of $rr''$, which we may term its K. E. Any given incremental angle as $\theta$ is determined thus:

$$\theta = \frac{\text{dim. cho. C (crank rad.} \times 2)}{\text{dim. rad. of anchor lever } a}$$

IV. While the integral projection $b'$ of the slide lever $b$, pivoted on the top pin $k'$ of the slide $s$ in the fixed guide $g$, has been pulled down for the stroke $s'$ of said slide $s$, it has been simultaneously oscillated on said top pin $k'$ through the angle $\theta''$ of identical amplitude to the angle $\theta'$ of said slide lever $b$, so that its forward end has described an arc whose dim. cho is $r'' \times$ func. cho. $\theta'' = s''$, being the chordial stroke of end to angle $\theta$.

Since the projection $b'$, during its oscillatory downward stroke, through said chordal stroke $s''$, has simultaneously been pulled down, by $w'$, force of the infinite plane retractive effort of the mutually articulated slide lever $b$ and anchor lever $a$ toward their fulcrum $f$, for the slide stroke $s'$, its forward end delivers a composite stroke of the sum of these motions:

Dim. vers. $\theta$ of anchor lever $a$ + dim. vers. $\theta'$ of slide lever $b$ + dim. chord $\theta''$ of projection $b'$, designated as $s'''$.

V. While the infinite plane retractive force $w'$ has been transmitted, through the top pin $k'$ to the slide $s$ in the rigid guide $g$ for the slide stroke $s'$, the forward projection $b'$ of the slide lever $b$ has been simultaneously oscillated by a force of $w' \times r' \div r'' = w''$, which force, delivered through said composite delivery stroke $s'''$ (sec. IV) constitutes the working pressure delivered by the forward end of the projection $b'$, pivoted on pin $k'$. Such working pressure delivery is correctly symbolized as $w''s'''$.

The previously described adjusting mechanism for adjusting the length of the operating crank enables the ram stroke to be adjusted and a very precise adjustment of this stroke is provided for, it being possible to adjust the stroke in increments of .0005" or less. The adjustment of the crank effectively regulates both the delivery stroke, corresponding to the motion imparted at the given setting to the slide lever, and the delivery pressure, corresponding to the proportion of the selected crank radius to the constant radius of the driving member or gear actuating the crank shaft. It is obvious that enormous pressures are easily attainable whenever this proportion is large, in the selected setting.

The combined effects of ease and power and precision of work on the material well qualify the mechanism comprising the linkage and crank as the ram-operating element of the machine tool.

It will be noted that the speed at which the ram effects its stroke is under the control of the variable speed mechanism 30. By proper selection of this mechanism, a very nice control of the speed can be obtained, and in the machine illustrated the flywheel speeds are, say, from one hundred sixty to five hundred per minute.

*The operation of the machine*

The ram being equipped with the proper tool for the work to be done, for example, the punch shown in the drawings, and the platen of the work table having clamped therein in proper position the die for cooperation with the punch, and the proper adjustment of the crank mechanism having been made, the machine is ready for operation, the pressure linkage being in the infinite-plane position, the fracture proofer being at the top of its stroke, and the work table being in a lowered position. The term "punch" is used for brevity as designating the pressing tool. The platen will have been precisely adjusted as to height by the manipulation of the hand-operated hydraulic lifting mechanism, so that when the table is raised to the top of its stroke, the work plate which has been laid on the die will be in close contact with the lower face of the punch. It is assumed for descriptive purposes that the operation of the machine in this instance is to be semi-automatic and that the work piece is to be subjected to a cold flowing operation as described in Patent No. 2,039,842, and is placed on the platen by hand.

Upon depression of the pedal device L by the foot of the operator, the long link 484 is pulled forwardly, actuating elbow lever 485 (Fig. 15ᴮ) and raising guide rod 478 to carry upward frame member 474. The result of this upward movement of member 474 is that member 331 is raised from the position of Fig. 2, lifting latching pin 325 which holds the spring 338 energized so that the rod 240 of the spring motor of the work table moves the work table upwardly, operating through the connections previously described. The raising of the table under the action of the spring is very rapid, and the work piece is thereby moved into contact with the lower face of the upper tool.

Upon further movement of the pedal device L, the lever 469 connected to frame 474 being raised to a predetermined extent and lifting link 462, the locking pin or detent 214 of the spring actuator of the hydraulic pressure cylinder of the fractureproofer being released, liquid is forced into the hydraulic cylinder, causing lowering of the fractureproofer in the manner previously described. The action of the spring plunger of the actuator is very rapid, practically instantaneous, and the effect upon the hydraulic piston immediate, causing the fracture-proofing plate to be brought down against the work piece and pressed against it under a heavy pressure. It is an important feature of the present invention that high fracture-proofing pressures are attainable from the machine and are used in connection with certain work. In the machine illustrated, this pressure, which is infinitely variable, may be anywhere from one thousand pounds to two hundred thousand pounds. An indicator, not shown, is usually associated with the hydraulic cylinder, so that the pressure being exerted is readily visible by the operator.

In the particular operation being described, the fracture-proofing plate is pressed down around the punch and against the work piece supported by the die, under heavy pressure. The amount of pressure will depend upon the character of the metal being operated upon, the thickness of the work piece, and other factors.

Upon further movement of the pedal device L, the turning of the rock shaft 459 consequent upon lifting of frame member 474 will cause arm or lever 458 (Fig. 15) to be shifted to depress the right-hand end (Fig. 15) of lever 435, thereby lowering the left-hand end and with it the sleeve 442 and the spindle 429. This causes the left-hand end (Fig. 15) of lever 411 to be depressed, moving down the stop 402, so that it is out of the path of the driven member of the clutch K. The clutch is then engaged very quickly, practically instantaneously, the stored-up energy of the spring associated with the lever for shifting the bolt member 349 being available to project the bolt member very rapidly into locking engagement with one of the locking elements of the driving member, the locking element next in advance of the one just mentioned having operated on lever 379 to release the bolt member.

It will be understood that upon the downward movement of the left-hand end of lever 411, as above mentioned, the cap-like member 406 will be pulled down with the spindle 405, compressing the spring 407, and that when the cap member reaches the lower arm of elbow lever 418, the elbow lever will be swung to release the pin 415 locking the stop 402 to the bracket 414, the stop at this point being free to move down rapidly under the thrust of the spring 407. It will be apparent that on the return upward movement of the stop at a later stage, the detent pin 415 will be pressed by the spring into locking engagement with the bracket.

The shaft J being driven at the proper speed, and the heavy flywheel having stored up considerable energy, the rotation of the shaft F and the movement of the tractor levers is immediately commenced, and the ram moves through its down stroke for effecting the cold flowing of the work piece. The work piece being closely confined from beneath and from above, and located under opposing heavy pressures on its upper and lower surfaces, the punch moves into the metal as shown in Fig. 8ᴬ to cause extrusion by cold flow, and on further movement it passes completely through the work piece to eject the slug as shown in Fig. 8ᴮ, the slug moving downwardly through the work table to the discharge, previously described. At approximately the stage represented in Fig. 8ᴮ, the actuating crank pin of the linkage is at the right-hand dead center, as shown in full lines in Fig. 5.

At the end of the downward movement of the pedal device L (in the semi-automatic operation of the machine), the roller 449 engages the screw 450 of lever 451, and this causes the release of locking pin or detent 443, and this permits spring 453 acting on the spring stop 432 to raise the spindle 429 to the position shown in Fig. 15, restoring the stop 402 to its stopping position. Also, immediately following this operation, elbow lever 489 comes into contact with stop 490 (Fig. 15ᴮ), so as to release the sleeve 488 from the guide rod 478. This causes the guide rod 478, the frame 474, and the associated parts to be lowered again to the initial position, this action being assisted by the weight 454 (Fig. 15).

As the crank pin passes the right-hand dead-center position (Fig. 5) and the ram commences the return stroke, the spring motor associated with the work table is reenergized or cocked by the action of the eccentric 311 acting on the lever 316 to retract the member 323, the work table moving to the lowered position. The retraction of member 323 causes the rod 240 to be drawn rearwardly, recocking the spring motor. Also, at this same time the eccentric 311, acting through the lever 211 (Figs. 2 and 7), retracts the spring plunger of the fracture-proofing spring motor and latches it in the retracted position, the fractureproofer moving upward. At this stage the work piece is released and can be shifted or moved as desired.

In recocking the spring motor of the fractureproofer, the carrier sleeve 199 is carried to the right (Fig. 5), through the member 211 and the connections previously described, until the upper extremity of elbow lever 203 engages a stop on the right-hand end (Fig. 5) of rod 205. At the time when this occurs the detent pin 214 will be in engagement or on the point of engagement with the cooperating recess 214a which is provided in the piston 191. On further movement of the carrier sleeve the elbow lever 203 will be rocked on its fulcrum to pull out the detent 200 from recess 201, the parts then being restored to the position of Fig. 4, with detent 200 freed from rod 196.

Toward the end of the cycle, the driven member of the clutch is coming around to the end of the full revolution, and at this point the duplex elbow lever engages the stop 402, causing the bolt member 349 to be withdrawn for disengaging the clutch and causing the driven member to be arrested in the position of Fig. 16.

In the event that the operation of the press is to be fully automatic, the work piece being fed through by suitable feed mechanism, it is preferable to lock the pedal L in the depressed position, and provisions are made for holding the stop 402 out of action. In the instance shown, the stop device 450, 451 (Fig. 15), which is active in restoring the stop to the stopping position, is swung down to the position shown in dotted lines when fully automatic operation is desired.

At the end of the cold flowing operation, shown in Figs. 8A and 8B, the position of the pressing tool, the fractureproofer, and the rest plate is shown in Fig. 8C. This indicates, by way of example, the lowering of the table to an extent sufficient for the removal or shifting of the work piece.

In addition to the utilization of the machine for operations in which metal such as steel is subjected to cold flow by confining the work piece and subjecting a prescribed area thereof to initially maximum falling pressure (the discovery of the present inventor), it may be employed for many different kinds of metal-working operations on cold or hot metal or material and for the formation of products of a very varied nature. The possible operations which are included are profiling, broaching and slotting, detruding and extruding, spur-gear cutting, blanking and forming, forging, and coining.

In Fig. 25 is shown, by way of example, a plunger and die such as used in coining operations, where a coin is formed and given ornamental embossing on the faces—an operation which naturally requires a high degree of pressure and to which the present machine is admirably suited. Here the die is indicated at 560 and the punch at 561. The fracture proofer is shown at 562, and the material out of which the coin is punched at 563.

In doing work of this kind, the plunger stroke is relatively short, which can be readily taken care of by the micrometer adjustment of the operating crank which, in the machine illustrated, varies the plunger stroke from zero to $4\frac{1}{10}$ inches.

In an operation of this kind, the machine is so adjusted that at the end of the tool action on the work there is a relative decrease of speed (owing to the position of the linkage-operating crank), giving an increased final pressure, which is very desirable for work of this class. The upper tool starts its movement at a speed which is practically nil and increases progressively until just before the end of the stroke, and while the tool is pressing the work in the closed die, the pressure increases as a result of the crank action, and this accomplishes the final forming and gives the embossed or ornamented surface the desirable sharp definition.

It will be seen from Fig. 22, for example, that in the machine illustrated the tractor levers at the end of the maximum ram stroke and with the maximum crankage have an angle to the vertical in the neighborhood of ten degrees. Hence, the tractor levers are utilized only in positions relatively close to the infinite plane, where they have a very powerful action. Nevertheless, by the present invention a most important result is accomplished, namely, that the moving tool has a reciprocating movement which is more than sufficient for the intended purposes. And it is a further important advantage that minimum crankage is required and that such a direct connection exists between the crank and the tool. For producing a final increased pressure, as above described, the chief factor, as will be apparent, will be the selection of the proper crank stroke in relation to the tool stroke necessary for the flowing of the metal completely into the cavities of the die and punch.

In the machine shown, the work table has infinitely variable pulsations ranging from .0025″ to .46875″ which prelock the work against the tool with infinite variable pressures from one thousand to two hundred thousand pounds.

The full floating lubricated pins used for the pivoting of the high-pressure linkage members provide for the easy working of the linkage and protect it from wear.

The advantages of the shock-absorbing safety clutch have been previously mentioned. This clutch, which acts as an equilibrator between resistance and crank on one side, and flywheel and crank on the other side, is capable of transmitting a large torque shocklessly. It engages and disengages with a remarkable rapidity.

It is very important that the upper and lower tools be capable of being easily centralized with respect to the ram axis, which is permitted by the present construction.

It will be apparent that the tools can be very quickly changed. On releasing the ram slide or movable wall, the entire tool head with the demountable tool holder and the tool is exposed. The tool holder can be instantly slid into the operator's hand, the old tool lifted out, and the new tool dropped in, after which, when the ram slide is returned to its initial position in the manner above described, the tool and tool holder are automatically locked.

The mechanical platen, above described, is adapted to carry all sizes and shapes of dies, in interchangeable die holders, and as above described, has two automatic die setters. In the machine shown, one setter gives longitudinal die settings by .0005" increments, while the other gives lateral settings by .0001" increments. In adjusting the dies in the platen in the proper positions, it is desirable to fix the upper tool in its proper location and then adjust the dies to this upper tool. The operator holds both setting levers of the platen until a perfect setting shows.

The machine illustrated is intended for work at any speed between twenty and sixty ram strokes per minute.

It will be seen that the invention provides a machine tool of the reciprocating tool type having power comparable to that of an hydraulic press and yet operating at a high speed (comparable to that of the ordinary punch press), and that, with these attributes, it has the capability of producing cold flow in steel and other metals, and, further, the capability of working to an extremely high degree of precision, whether the particular operation being conducted is cold flowing or an operation of a different kind. Also, the great scope of utility of the machine will be apparent, as well as the simple, rugged character of the linkage and the relatively small number of parts employed in the linkage. Further, it will be apparent that the operation of the machine is kept under close and convenient control, and that the various adjustments, changes of tools, and setting up of the machine for a particular operation can be performed in an exact manner and yet quickly and conveniently. The ready accessibility of the various parts of the machine for inspection, adjustments, repairs or replacements will also be apparent.

While the term "fractureproofer" is used herein on account of the fact that the device exerting pressure around the tool from above serves to prevent fracture of the work piece, this particular designation of the pressure element is not intended to be limiting in effect. Obviously, the pressure element has other functions than preventing fracture. It is to be noted, among other things, that by providing pressures, say, up to two hundred thousand pounds, around the tool and against the work, the character of the operation performed by the machine on the work can be modified. For example, in some cases where cold flow is being performed, a relatively large "fracture-proofing" pressure may be of assistance in a more positive way than heretofore in enabling the punch to go through the work piece.

It will be apparent that various changes in the organization of parts and details of construction, and in the described procedures and use of the described structure, may be made without departing from the principles of the invention or the scope of the claims.

What is claimed is:

1. In a machine tool, a tool-equipped ram and a high-pressure linkage for operating said ram, said linkage including tractor levers and one of the tractor levers being a slide lever.

2. In a machine tool, a tool-equipped ram and a high-pressure linkage for operating said ram, said linkage including tractor levers and one of the tractor levers being a slide lever, the slide lever being link-connected to the ram.

3. In a machine tool, a tool-equipped ram, and a high-pressure linkage for operating the ram including a slidably mounted elbow lever, said elbow lever being part of an infinite-plane leverage.

4. In a machine tool, a tool-equipped ram, a link for operating the ram connected to the upper part thereof, and a system of tractor levers connected directly to said link and operable to slide the ram.

5. In a machine tool, a tool-equipped ram, a link for operating the ram connected to the upper part thereof, and a system of tractor levers connected directly to said link and operable to slide the ram, said system of levers including a slide lever and another lever relative to which a part of said slide lever may assume an infinite-plane position.

6. In a machine tool, a tool-equipped ram, and a slide lever having a link connection with the ram, said slide lever being part of an infinite-plane leverage.

7. In a machine tool, a tool-equipped ram, an elbow lever connected to the ram to slide the same, said elbow lever having at the elbow portion a sliding pivot, and means connected to the elbow lever to move the ram from rest at a progressively increasing speed in the direction of the work.

8. In a machine tool, a tool-equipped ram, a pair of tractor levers, and a connecting rod and crank for moving said levers out of the infinite-plane position, one of said tractor levers having an extension connected to said ram for moving the same.

9. In a machine tool, a tool-equipped ram, a link connected to the upper part of the ram and extending upward therefrom, an elbow lever having a forwardly projecting arm to which the upper end of said link is pivoted, sliding and pivoting means for said lever at the elbow portion thereof whereby said lever swings and slides with respect to a stationary extraneous support, a lever cooperating with said elbow lever and adapted to assume infinite-plane relationship with respect to the other arm of said elbow lever, and means for operating said levers.

10. In a machine tool, a pair of tractor levers having a knuckle connection between them, means including a crank and connecting rod for shifting said levers by pull on said knuckle connection from an infinite-plane position, one of said levers having a fixed outer end and the other having a sliding outer end, a rigid extension on said second lever adjacent the outer end thereof disposed at an angle to the body of the lever, and a sliding tool-equipped ram connected by a swinging connection to said extension.

11. In a machine tool of the press type, a ram, means for operating the ram, a substantially vertical guide for the ram, means located adjacent the upper end of the guide for adjusting the position of the ram in all directions in said guide, and means associated with the lower part of the ram guide for adjusting the position of the ram in all directions in said guide, said two means in conjunction providing for adjustment of the angle of travel of the ram axis.

12. In a machine tool of the press type, a ram, means for operating the ram, a substantially vertical guide for the ram, means associated with the guide at one point in its length for adjusting the position of the ram in all directions in the guide, and means spaced vertically from the first means for adjusting the position of the ram in all directions in the guide.

13. In a machine tool of the press type, a ram, means for operating the ram, a guide for the ram, and means at one point in the length of the ram guide including wedge-equipped gib keys having screws for moving them up and down in a positive manner for adjusting the position of the ram in all directions in said guide.

14. In a machine tool of the press type, a ram, means for operating the ram, a guide for said ram, and means adjacent the upper and lower parts of the ram guide including gib keys positively adjustable up and down for adjusting the position of the ram in all lateral directions in the guide.

15. In a machine tool of the press type, a ram, means for operating the ram, a guide for the ram having a liftable wall, and gear means whereby said wall can be lifted.

16. In a machine tool of the press type, a ram, means for operating the ram, a guide for the ram having a liftable wall, gear means whereby said wall can be lifted, said gear means including pinions mounted on the body portion of the guide adjacent the side edges of said wall, and racks on the wall engaged by said pinions.

17. In a machine tool of the press type, a ram, a substantially vertical guide for the ram, the ram having at its upper end an upward projection of partly cylindrical formation, a ram link whose lower end is provided with a socket receiving said projection, and means for operating the ram link.

18. In a machine tool of the press type, a ram, a substantially vertical guide for the ram, the ram having at its upper end an upward projection of partly cylindrical formation, a ram link whose lower end is provided with a socket receiving said projection, and means for operating the ram link, the upper part of the ram having adjacent the base of the projection upwardly converging surfaces, and the ram link having stop portions opposing said surfaces.

19. In a machine tool of the press type, a ram, a substantially vertical guide for the ram, a ram link located above the ram, said link and the ram having projection and socket interengagement permitting limited pivotal movement, and a forked member straddling the upper end of the ram link and pivoted thereto and adapted to have swinging movement for moving the ram in said guide.

20. In a machine tool, in combination, a sliding ram, a ram guide, a working tool carried by the ram, a fractureproofer cooperative with the working tool having guided supporting elements disposed extraneously of the ram guide and supported therefrom, a work table, means to pulsate said table, means to actuate said ram whereby said tool may perform a complete working stroke between pulsations of said table, and means to actuate said fractureproofer in timed relation to the pulsation of said table.

21. In a machine tool, in combination, a sliding ram, a ram guide, a working tool carried by the ram, a fractureproofer element cooperative with the tool, an actuator for the fractureproofer including an hydraulic cylinder and a coacting spring-moved actuator for the cylinder, a work table, means to pulsate said table, means to move the ram and tool, and means to actuate the fractureproofer in timed relation to the pulsation of the table.

22. In a machine tool, in combination, a sliding ram, a ram guide, a working tool carried by the ram, a fractureproofer element cooperative with said tool, means including a lever element for exerting a predetermined amount of pressure on the fractureproofer element, said fractureproofer element having moving guiding means mounted on the sides of the ram guide, a work table, means to pulsate said table, means to actuate said ram and tool, and means for operating said fractureproofer pressure means in timed relation to the pulsation of said table.

23. In a machine tool, in combination, a working tool, a work table, means to pulsate said table, means to actuate said tool, and a fractureproofer cooperative with said tool including an hydraulic cylinder and a piston, and a spring-moved actuator for said cylinder and piston.

24. In a machine tool, in combination, a working tool, a work table, means to pulsate said table, means to actuate said tool, a lever pivoted intermediate of its ends on the frame of the machine, a fractureproofer element cooperative with said tool and operated from one end of said lever, and a pressure element operative on the other end of said lever.

25. In a machine tool, in combination, a working tool, a work table, means to pulsate said table, means to actuate said tool, a fractureproofer element cooperative with said tool, a fluid-pressure-operated element for moving said fractureproofer element, and a spring motor for causing operation of said fluid-pressure element.

26. In a machine tool, in combination, a working tool, a work table, means to actuate said tool, a fractureproofer cooperative with said tool, a fluid-pressure element for causing pressure on said fractureproofer against the work, a spring motor for energizing said fluid-pressure element, and means for actuating said spring motor in timed relation to the actuation of said tool.

27. In a machine tool, in combination, a sliding ram, a ram guide, a tool carried by the ram, a work table, means to actuate said ram and tool, a fractureproofer cooperative with said tool, guide elements for said fractureproofer mounted on the sides of the ram guide, means for moving said guide elements, and micrometrically adjustable connecting means between said moving means and said fractureproofer.

28. In a machine tool, in combination, a sliding ram, a ram guide, a working tool carried by the ram, a work table, means to actuate the ram and tool, a fractureproofer cooperative with the tool, a fracture-proofer-operating lever pivoted intermediate of its ends on the machine frame, adjustable means of connection between one end of said lever and the fractureproofer, and fluid-pressure means acting on said lever at the opposite end of the latter.

29. In a machine tool, a frame having parallel rearwardly extending walls, a vertical ram guide in front of said walls, a ram in said guide, a tool carried by the ram, a high-pressure linkage between said walls connected to said ram to move the same in said guide, a fractureproofer cooperative with said tool, a lever disposed longitudinally to said walls and between the same pivoted to the machine frame and connected to said fractureproofer, and a pressure element between said walls operatively connected to said lever.

30. In a machine tool, in combination, a ram guide, a ram sliding therein, a tool carried by the ram, a fractureproofer in cooperative relation to the tool, and independent means exerting pressure on said fractureproofer, said means having an operating element in straddling relation to the ram.

31. In a machine tool, in combination, a ram guide, a ram sliding therein, a tool carried by the ram, a fractureproofer in cooperative relation to the tool, and independent means exerting pressure on said fractureproofer, said means having an operating element in straddling relation to the ram guide.

32. In a machine tool, in combination, a working tool, a work table, means to pulsate the table, means to actuate the tool, an independently movable fractureproofer cooperative with the tool, a fluid-pressure device for exerting pressure through the fractureproofer, a spring-motor device operable to increase the pressure exerted by said fluid-pressure device, and means for releasing and cocking said spring motor.

33. In a machine tool, in combination, a working tool, a fractureproofer cooperative therewith, a work table, means to pulsate said table, and a vertically adjustable platen supported by the work table adapted to support the work from beneath in opposition to the fractureproofer and tool.

34. In a machine tool, in combination, a working tool, a fractureproofer cooperative therewith, a work table, means to pulsate said table, a platen cooperative with the fractureproofer and tool, and means of connection between the platen and table whereby the former is supported from and actuated by the latter.

35. In a machine tool, in combination, a working tool, a fractureproofer cooperative therewith, a work table, means to pulsate said table, a platen cooperative with the fractureproofer and tool, and means of connection between the platen and table whereby the former is supported from and actuated by the latter, said means being manually adjustable to vary the level of the platen.

36. In a machine tool, in combination, a working tool, a fractureproofer cooperative therewith, a work table, means to pulsate said table, a platen cooperative with the fractureproofer and tool, and means of connection between the platen and table whereby the former is supported from and actuated by the latter, said means being manually adjustable to vary the level of the platen and including a plurality of platen-supporting fluid-pressure elements.

37. In a machine tool, in combination, a ram guide, a ram sliding in the guide, a tool carried by the ram, a work table, and a tool cooperative with the first tool carried by the work table, said work table being adjustable laterally in all directions relatively to said first tool.

38. In a machine tool, in combination, a ram guide, a ram sliding in the guide, a tool carried by the ram, a work table, a tool carried by the work table cooperative with the first tool, and quick-adjustable means associated with the work table for centering the second tool relatively to the first.

39. In a machine tool in combination, a ram guide, a ram sliding in the guide, a tool carried by the ram, a work table, means to pulsate said table, means for adjusting said work table laterally in all directions, a tool carried by the work table and cooperative with said first tool, and means associated with said work table whereby said second tool is adjustable laterally in all directions.

40. In a machine tool in combination, a ram guide, a ram sliding in the guide, a tool carried by the ram, a work table, means to pulsate said table, means for adjusting said work table laterally in all directions, a tool carried by the work table and cooperative with said first tool, and quick-adjustable means associated with said work table for centering the second tool relatively to the first.

41. In a machine tool, in combination, a ram guide, a ram sliding in said guide, a tool carried by the ram, a work table, means to pulsate said table, a platen supported from the work table, a second tool carried by the platen and cooperative with the first, quick-adjustable means carried by the platen for centering the second tool relatively to the first, means for adjusting the platen vertically with relation to the work table, and an independently operable pressure-operated fractureproofer cooperative with the tools.

42. In a machine tool, in combination, a working tool, a fractureproofer cooperative therewith, a work table, means to pulsate said table, a platen supported from beneath by the table, a tool carried by the platen cooperative with the first tool, and means for adjusting the platen relatively to the work table in order to obtain an initial upward pressure against the work supported against the working tool and fractureproofer before the working stroke of the tool commences.

43. In a tool press, a tool-carrying ram, means for operating the ram, a guide for the ram, a work table, a work table guide, means for adjusting the position of the work table in all directions in its guide, a platen adjustably supported from the work table, an independently operable fractureproofer, a tool carried by the platen, and means for centering said tool relatively to the tool carried by the ram.

44. In a machine tool, a table having a work-supporting face, and means including an oscillating eccentric-equipped shaft located beneath the table for pulsating the table perpendicularly to said face.

45. In a machine tool, a table having a work-supporting face, and means including an oscillating eccentric-equipped shaft located beneath the table for pulsating the table perpendicularly to said face, said means also including a reciprocating element mounted on the outer side of the machine frame connected to said shaft to actuate the same.

46. In a machine tool, a table having a work-supporting face, and means to pulsate said table perpendicularly to said face including a reciprocating spring-motor device mounted on the outer side of the machine frame.

47. In a machine tool, a table having a work-supporting face, and means to pulsate said table perpendicularly to said face including a reciprocating spring-motor device mounted on the outer side of the machine frame, said means also including an eccentric-equipped shaft located below the table, and connections between said shaft and said device.

48. In a machine tool, a table having a work-supporting face, and means to pulsate said table perpendicularly to said face including a lifting device having an element rotating on an axis positioned below the table body.

49. In a machine tool, a table having a work-supporting face, means to pulsate said table perpendicularly to said face including a lifting device positioned below the table body, and means located below said lifting device and adapted to raise the same whereby the initial vertical adjustment of the table can be varied.

50. In a machine tool, in combination, a working tool, a work table, a tool carried by the work table and cooperative with said first tool, and quick-adjustable means supported by the work table whereby the second tool can be adjusted laterally in said table in all directions.

51. In a machine tool, in combination, a working tool, a work table, a tool carried by the work table and cooperative with said first tool, quick-adjustable means supported by the work table whereby the second tool can be adjusted laterally in said table in all directions, said means including a wedge device for shifting the tool forwardly and rearwardly, and a second wedge device for shifting the tool in a sidewise direction.

52. In a machine tool, a work table, a tool-carrying plate, wedge devices carried by the table whereby the tool is adjustable laterally in all directions relatively to the table, and an operating device having a movable member effecting adjustment of the tool in one direction and a second movable member effecting adjustment in a direction at right angles to the first direction.

53. In a machine tool, in combination, a machine frame, a vertically movable work-supporting table mounted therein, a power shaft mounted in said frame, and means for raising said table comprising a laterally reciprocating spring-motor device mounted on one of the lateral walls of the frame at the exterior and connected to said shaft to be controlled therefrom.

54. In a machine tool, in combination, a working tool, a vertically movable work table carrying a tool cooperative with said first tool, an independently operable fractureproofer cooperative with said tools, means to actuate said first tool to perform a complete working stroke, means to pulsate said table before the working stroke begins, and means to actuate said fractureproofer to bring pressure on the work before the beginning of the working stroke.

55. In a machine tool, in combination, a reciprocating working tool, a vertically movable work table, a fractureproofer above the work cooperative with said first tool and with said work table, means for moving said fractureproofer to bring pressure against the work, means to raise said table, a power shaft for actuating said first tool, a clutch for rotating said power shaft, means for engaging the clutch, and means operable from said last means preliminary to starting of the tool stroke for causing set-up movements of the table and fractureproofer.

56. In a machine tool, in combination, a reciprocating working tool, a vertically movable work table, a fractureproofer above the work cooperative with said first tool and with said work table, means for moving said fractureproofer to bring pressure against the work, means to raise said table, a power shaft for actuating said first tool, a clutch for rotating said power shaft, means for engaging the clutch, and means operable from said last means preliminary to starting of the tool stroke for causing set-up movements of the table and fractureproofer, the table being actuated in advance of the fractureproofer.

57. In a machine tool, in combination, a reciprocating working tool, a work table, means for lifting the work table, a fractureproofer cooperative with the tool and work table and having an actuating spring motor to initiate its operation for bringing pressure against the work, means for actuating said tool, and means operative prior to the commencement of the working stroke to release said spring motor.

58. In a machine tool, in combination, a reciprocating tool, a work table, means for lifting the work table, a fractureproofer cooperative with said tool and with said table for bringing pressure against the work independently of the tool, a power shaft for actuating the tool, a clutch for rotating said shaft, clutch-engaging means, and means controlled from the clutch-engaging means and operative prior to the commencement of the working stroke of the tool for actuating the fractureproofer.

59. A method of working in the cold a metal or like work piece which comprises subjecting the part or parts of the work piece to be worked to an intensive working pressure with the work tool from the commencement of the operation in contact with the work piece, applying the pressure on the work piece at a low initial velocity which increases smoothly by small increments up to an intermediate point in the working stroke, and then at the end portion of the stroke progressively decreasing the speed and increasing the pressure.

60. In a machine tool, a reciprocating tool, a work table, means for lifting the work table, a fractureproofer cooperative with the tool and work table, an hydraulic device for moving the fractureproofer under pressure to exert pressure on the work in the direction of the work table, a high-pressure linkage for moving the tool, a power shaft for actuating the linkage, a clutch for initiating operation of said power shaft, clutch-engaging means, and means controlled from the clutch-engaging means and acting prior to the commencement of the tool stroke for actuating said hydraulic device.

61. In a machine tool, a frame, a reciprocating tool mounted therein, a high-pressure linkage for operating the tool, a crank and connecting rod structure for operating said linkage having micrometric means of adjustment for varying the throw of the linkage and tool, and an actuator for said means of adjustment mounted on the frame.

62. In a machine tool, a frame, a reciprocating tool mounted therein, a high-pressure linkage for operating the tool, a crank and connecting rod structure for operating said linkage having micrometric means of adjustment for varying the throw of the linkage and tool, and an actuator for said means of adjustment mounted on the frame, said actuator being accessible at the exterior of the frame and being movable on the frame between a position in which the means of adjustment is engaged for operation and a position in which said means is disengaged.

63. In a machine tool, a frame, a reciprocating tool mounted therein, a high-pressure linkage for operating the tool, a crank and connecting rod structure for operating said linkage having micrometric means of adjustment for varying the throw of the linkage and tool, and an actuator for the means of adjustment movably mounted on the frame and including manually operable gear means.

64. In a machine tool, a frame, a reciprocating tool mounted therein, a high-pressure linkage for operating the tool, a crank and connecting rod structure for operating said linkage having micrometric means of adjustment for varying the throw of the linkage and tool, and an actuator for the means of adjustment movably mounted on the frame and including manually operable gear means, said actuator being accessible at the exterior of the frame and being movable in an inward direction relatively to the frame for engaging and operating the means of adjustment.

65. In a machine tool, a frame, a tool-operated linkage mounted in the frame, means for operating the linkage including a connecting rod structure of adjustable length having a member which for adjustment is turned on an axis longitudinal to the connecting rod structure, and means mounted on the frame adapted to be moved into cooperation with said member for turning the same.

66. In a machine tool, a tool-equipped ram, a high-pressure linkage for operating the ram, and means including an adjustable crank and connecting rod member for operating the linkage, said member having micrometric length-adjusting means which is self-locking.

67. In a machine tool, a tool-carrying ram, and a high-pressure linkage for operating the ram comprising tractor levers, said tractor levers having full-floating pivoting pins.

68. In a machine tool, a tool-carrying ram, a high-pressure linkage for moving the ram, a power shaft for operating the linkage, a drive shaft, and a clutch having shock-absorbing bolt means for interconnecting said shafts.

69. In a clutch such as described, a rotating driving member, a rotating driven member, one of said members carrying a movable bolt, the other member carrying abutments with intervening spaces in which the bolt is movable to engage the abutments, said abutments having spring-supported bolt-engaging members.

70. In a clutch such as described, a rotating driving member, a rotating driven member, one of said members carrying a movable bolt, the other member carrying abutments with intervening spaces in which the bolt is movable to engage the abutments, said abutments having spring-supported bolt-engaging members supported for chordial movements relatively to the abutments.

71. In a machine tool, a high pressure tool linkage, and a combined crank and connecting rod member for operating the linkage, said member being adjustable as to length by oppositely threaded members whereby it is rendered self-locking.

72. In a machine tool, a high pressure tool linkage, and a micrometrically adjustable crank and connecting rod structure for operating the linkage.

73. In a machine tool, a high pressure tool linkage and a micrometrically adjustable crank and connecting rod structure for operating the linkage, said structure including a shaft made in sections, each having a transversely arranged slideway, blocks movable in said slideways, a crank pin disposed between and connected to the blocks, and means for adjusting the blocks.

74. In a machine tool, a sliding tool element, tractor levers for moving the tool element having a starting infinite-plane position, and a crank and connecting rod structure for operating the tractor levers, said crank and connecting rod structure being adjustable to provide for different optional tool movements.

75. In a machine tool, a moving tool, a linkage for moving the tool at gradually increasing speed, and operating means for the linkage comprising a combined crank and connecting rod member adjustable in length to provide for tool movements of different lengths.

76. A mechanical motion for presses and the like, comprising a pair of tractor levers adapted to have infinite-plane relationship, and means for pulling the levers out of the infinite-plane position, one of said levers having a slide mounting for its outer or free end and carrying an angular projection whose outer end describes an arc about a swinging center for transmitting movement to an external movable member.

77. A machine tool comprising a pair of tractor levers adapted to have infinite-plane relationship, one of said levers having a slide mounting for its outer or free end and carrying adjacent said end an angular projection, a movable tool connected to said angular projection, and tractor means for operating the levers.

78. In a machine tool, a sliding tool element and a high-pressure linkage for operating said element, said linkage including tractor levers arranged for infinite-plane disruption one of which has a sliding outer end connected to the tool element.

79. In a machine tool, a sliding tool element and a high-pressure linkage for operating said element, said linkage including articulate members adapted to disrupt an infinite plane, one of said members having as a part thereof a displacing and rotating tool beam connected to said tool element.

80. In a machine tool, a pair of tractor levers having a knuckle connection between them, means for shifting said levers from a starting infinite-plane position, one of said levers having a fixed outer end pivot and the other having a displacing and turning outer end, and tool means operable from said last-named end.

81. In a machine tool, a tool-equipped ram, a link connected to the upper part of the ram and extending upward therefrom, an elbow lever having a forwardly projecting arm to which the upper end of said link is pivoted, mounting means for said lever at the elbow portion thereof whereby said lever swings and is displaced with respect to a stationary extraneous support, a lever cooperating with said elbow lever and adapted to assume infinite-plane relationship with respect to the other arm of said elbow lever, and means for operating said levers.

82. In a machine tool, a tool-equipped ram, tractor levers for operating the ram having a knuckle connection between them and a starting position in which they are in infinite-plane relationship, one of said levers being a slide lever connected to the ram, and an operating crank and connecting rod connected to the knuckle.

83. In a machine tool, a tool-equipped ram, a displaceably mounted elbow lever operably connected to the ram, and a second lever which with the elbow lever provides a disruptive articulated infinite-plane relationship.

84. In a machine tool, a tool-equipped ram, a link for operating the ram connected to the upper part thereof, and a pair of tractor levers for operating the ram having a starting infinite-plane position, one of said levers being directly connected to said link.

85. In a machine tool, a tool-equipped ram, a link for operating the ram connected to the upper part thereof, a pair of tractor levers having a knuckle connection between them and a starting infinite-plane position, one of said levers being directly connected to said link, and an adjustable connecting rod and crank structure connected to the knuckle.

86. In a machine tool, a tool-equipped ram, an elbow lever connected to the ram to slide the same, said elbow lever having at the elbow portion a displacing pivot, and means connected to the elbow lever to move the ram from rest at a progressively increasing speed in the direction of the work.

87. In a machine tool, a sliding tool element, tractor levers for moving the tool element having a starting infinite-plane position and having a knuckle connection between their adjacent ends, and a crank and connecting rod structure connected to the knuckle for operating the tractor levers and adjustable to provide for different optional tool movements.

88. In a machine tool, a pair of tractor levers of which one is disposed above the other, the lower lever having a fixed lower pivot and the two levers having a connection between their adjacent ends, the upper lever having a rigid forwardly projecting elbow portion at its upper part, a mounting in which the elbow portion of the upper lever can slide up and down as the elbow portion turns, a link connected to the elbow portion and depending therefrom, a slidably mounted tool-carrying ram connected to the link, and an actuator for the levers connected thereto adjacent the connection between them.

89. In a machine tool, a tool-equipped ram, a lever having a sliding and swinging elbow portion operably connected to the ram, a second lever having an end connected by a pivotal connection to the first lever and providing with the first lever a pair of tractor levers which start the ram movement from an infinite-plane position, a connecting rod connected to said pivotal connection, and a crank element connected to the connecting rod.

BEATRICE WIMER HOWLAND-SHEARMAN,
*Executrix of the Last Will and Testament of Charles H. Howland-Shearman, Deceased.*

REFERENCES CITED

The following references are of record in the file of this patent:

UNITED STATES PATENTS

| Number | Name | Date |
|---|---|---|
| 2,039,842 | Howland-Shearman | May 5, 1936 |
| 1,241,728 | Grandchamp | Oct. 2, 1917 |
| 1,498,099 | Howland-Shearman | June 17, 1924 |
| 823,273 | Hanna | June 12, 1906 |
| 2,056,402 | Klocke | Oct. 6, 1936 |
| 934,194 | Lesan | Sept. 14, 1909 |